(12) United States Patent
Rivard et al.

(10) Patent No.: US 8,976,264 B2
(45) Date of Patent: Mar. 10, 2015

(54) COLOR BALANCE IN DIGITAL PHOTOGRAPHY

(75) Inventors: William Guie Rivard, Menlo Park, CA (US); Adam Barry Feder, Mountain View, CA (US); Brian Kindle, Sunnyvale, CA (US)

(73) Assignee: Duelight LLC, Sunnyvale, CA (US)

( * ) Notice: Subject to any disclaimer, the term of this patent is extended or adjusted under 35 U.S.C. 154(b) by 149 days.

(21) Appl. No.: 13/573,252

(22) Filed: Sep. 4, 2012

(65) Prior Publication Data

US 2014/0176757 A1      Jun. 26, 2014

(51) Int. Cl.
*H04N 9/73* (2006.01)
*G06K 9/00* (2006.01)

(52) U.S. Cl.
USPC .................... 348/223.1; 382/162; 382/168

(58) Field of Classification Search
CPC ......... H04N 9/73; H04N 9/735; H04N 9/045; H04N 1/6086
USPC ........... 348/370–371; 382/162, 167–169, 284
See application file for complete search history.

(56) References Cited

U.S. PATENT DOCUMENTS

| | | | |
|---|---|---|---|
| 7,760,246 B2* | 7/2010 | Dalton et al. | 348/224.1 |
| 2010/0208099 A1* | 8/2010 | Nomura | 348/223.1 |
| 2012/0262600 A1* | 10/2012 | Velarde et al. | 348/223.1 |
| 2013/0335596 A1* | 12/2013 | Demandolx et al. | 348/231.99 |

* cited by examiner

*Primary Examiner* — Kelly L Jerabek
(74) *Attorney, Agent, or Firm* — Zilka-Kotab, PC

(57) ABSTRACT

A technique for generating a digital photograph comprises blending two related images, each sampled according to a different illumination environment. The two related images are blended according to a blend surface function that includes a height discontinuity separating two different blend weight regions. Color consistency between the two related images is achieved by spatial color correction prior to blending. The technique enables a digital camera to generate a strobe image having an appearance of consistent color despite discordant strobe and ambient scene illumination.

40 Claims, 20 Drawing Sheets

COLOR BALANCE IN DIGITAL PHOTOGRAPHY

BACKGROUND OF THE INVENTION

1. Field of the Invention

Embodiments of the present invention relate generally to photographic systems, and more specifically to systems and methods for improved color balance in digital photography.

2. Description of the Related Art

A typical digital camera generates a digital photograph by focusing an optical image of a scene onto an image sensor, which samples the optical image to generate an electronic representation of the scene. The electronic representation is then processed and stored as the digital photograph. The image sensor is configured to generate a two-dimensional array of color pixel values from the optical image, typically including an independent intensity value for standard red, green, and blue wavelengths. The digital photograph is commonly viewed by a human, who reasonably expects the digital photograph to represent the scene as if observed directly. To generate digital photographs having a natural appearance, digital cameras attempt to mimic certain aspects of human visual perception.

One aspect of human visual perception that digital cameras mimic is dynamic adjustment to scene intensity. An iris within the human eye closes to admit less light and opens to admit more light, allowing the human eye to adjust to different levels of light intensity in a scene. Digital cameras dynamically adjust to scene intensity by selecting a shutter speed, sampling sensitivity ("ISO" index of sensitivity), and lens aperture to yield a good exposure level when generating a digital photograph. A good exposure generally preserves subject detail within the digital photograph. Modern digital cameras are typically able to achieve good exposure for scenes with sufficient ambient lighting.

Another aspect of human visual perception that digital cameras mimic is color normalization, which causes a white object to be perceived as being white, even under arbitrarily colored ambient illumination. Color normalization allows a given object to be perceived as having the same color over a wide range of scene illumination color and therefore average scene color, also referred to as white balance. For example, a white object will be perceived as being white whether illuminated by red-dominant incandescent lamps or blue-dominant afternoon shade light. A digital camera needs to compensate for scene white balance to properly depict the true color of an object, independent of illumination color. For example, a white object illuminated by incandescent lamps, which inherently produce orange-tinted light, will be directly observed as being white. However, a digital photograph of the same white object will appear orange without compensation for the orange white balance imparted by the incandescent lamps. To achieve proper white balance for a given scene, a digital camera conventionally calculates gain values for red, green, and blue channels and multiples each component of each pixel within a resulting digital photograph by an appropriate channel gain value. By compensating for scene white balance in this way, an object will be recorded within a corresponding digital photograph as having color that is consistent with a white illumination source, regardless of the actual white balance of the scene. In a candle-lit scene, which is substantially red in color, the digital camera may reduce red gain, while increasing blue gain. In the case of afternoon shade illumination, which is substantially blue in color, the digital camera may reduce blue gain and increase red gain.

In scenarios where a scene has sufficient ambient lighting, a typical digital camera is able to generate a digital photograph with good exposure and proper white balance. One technique for implementing white balance compensation makes a "gray world" assumption, which states that an average image color should naturally be gray (attenuated white). This assumption is generally consistent with how humans dynamically adapt to perceive color.

In certain common scenarios, ambient lighting within a scene is not sufficient to produce a properly exposed digital photograph of the scene or certain subject matter within the scene. In one example scenario, a photographer may wish to photograph a subject at night in a setting that is inadequately illuminated by incandescent or fluorescent lamps. A photographic strobe, such as a light-emitting diode (LED) or Xenon strobe, is conventionally used to beneficially illuminate the subject and achieve a desired exposure. However, the color of the strobe frequently does not match that of ambient illumination, creating a discordant appearance between objects illuminated primarily by the strobe and other objects illuminated primarily by ambient lighting.

For example, if ambient illumination is provided by incandescent lamps having a substantially orange color and strobe illumination is provided by an LED having a substantially white color, then a set of gain values for red, green, and blue that provides proper white balance for ambient illumination will result in an unnatural blue tint on objects primarily illuminated by the strobe. Alternatively, a set of gain values that provides proper white balance for the LED will result in an overly orange appearance for objects primarily illuminated by ambient incandescent light. A photograph taken with the LED strobe in this scenario will either have properly colored regions that are primarily illuminated by the strobe and improperly orange regions that are primarily illuminated by ambient light, or improperly blue-tinted regions that are primarily illuminated by the strobe and properly colored regions that are primarily illuminated by ambient light. This photograph will conventionally include regions that are unavoidably discordant in color because the white balance of the strobe is different than that of the ambient illumination.

One approach to achieving relatively consistent white balance in strobe photography is to flood a given scene with illumination from a high-powered strobe or multiple high-powered strobes, thereby overpowering ambient illumination sources and forcing illumination in the scene to the same white balance. Flooding does not correct for discordantly colored ambient light sources such as incandescent lamps or candles visible within the scene. With ambient illumination sources of varying color overpowered, a digital camera may generate a digital photograph according to the color of the high-powered strobe and produce an image having very good overall white balance. However, such a solution is impractical in many settings. For example, a high-powered strobe is not conventionally available in small consumer digital cameras or mobile devices that include a digital camera subsystem. Conventional consumer digital cameras have very limited strobe capacity and are incapable of flooding most scenes. Furthermore, flooding a given environment, such as a public restaurant or indoor space, with an intense pulse of strobe illumination may be overly disruptive and socially unacceptable in many common settings. As such, even when a high-powered strobe unit is available, flooding an entire scene may be disallowed. More commonly, a combination of partial strobe illumination and partial ambient illumination is available, leading to discordant white balance within a resulting digital photograph.

As the foregoing illustrates, what is needed in the art is a technique for generating a digital photograph having consistent white balance with partial strobe illumination.

SUMMARY OF THE INVENTION

One embodiment of the present invention sets forth a method for generating a blended image from a first image and a second image, the method comprising generating a color corrected pixel, generating a blended pixel based on the color corrected pixel, and storing the blended pixel within the blended image. The color corrected pixel is generated based on a first pixel of the first image, a second pixel of the second image, correction factors, and histogram factors. The blended pixel is generated based on the first pixel, the color corrected pixel, and a blend surface. The correction factors characterize color divergence between the first image and the second image, and the histogram factors characterize intensity distribution within the first image and intensity distribution within the second image.

Further embodiments of the present invention include, without limitation, a non-transitory computer-readable storage medium that includes instructions that enable a computer system to implement one or more aspects of the above methods as well as a computer system configured to implement one or more aspects of the above methods.

One advantage of the present invention is that a digital photograph may be generated having consistent white balance in a scene comprising regions illuminated primarily by a strobe of one color balance and other regions illuminated primarily by ambient illumination of a different color balance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention enable digital photographic systems having a strobe light source to beneficially preserve proper white balance within regions of a digital photograph primarily illuminated by the strobe light source as well as regions primarily illuminated by an ambient light source. Proper white balance is maintained within the digital photograph even when the strobe light source and an ambient light source are of discordant color. The strobe light source may comprise a light-emitting diode (LED), a Xenon tube, or any other type of technically feasible illuminator device. Certain embodiments beneficially maintain proper white balance within the digital photograph even when the strobe light source exhibits color shift, a typical characteristic of high-output LEDs commonly used to implement strobe illuminators for mobile devices.

Figure 1A:
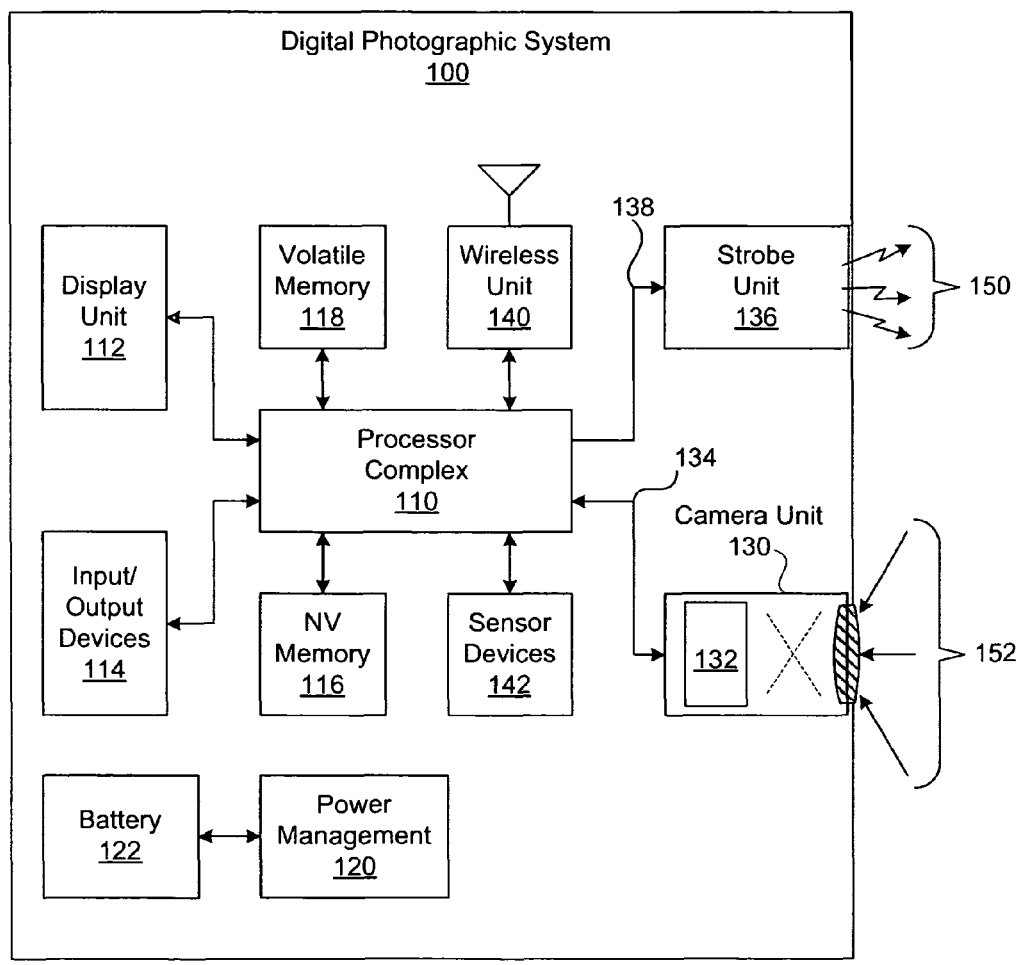
FIG. 1A illustrates a digital photographic system, configured to implement one or more aspects of the present invention.

FIG. 1A illustrates a digital photographic system 100, configured to implement one or more aspects of the present invention. Digital photographic system 100 includes a processor complex 110 coupled to a camera unit 130. Digital photographic system 100 may also include, without limitation, a display unit 112, a set of input/output devices 114, non-volatile memory 116, volatile memory 118, a wireless unit 140, and sensor devices 142, coupled to processor complex 110. In one embodiment, a power management subsystem 120 is configured to generate appropriate power supply voltages for each electrical load element within digital photographic system 100, and a battery 122 is configured to supply electrical energy to power management subsystem 120. Battery 122 may implement any technically feasible battery, including primary or rechargeable battery technologies. Alternatively, battery 122 may be implemented as a fuel cell, or high capacity electrical capacitor.

In one embodiment, strobe unit 136 is integrated into digital photographic system 100 and configured to provide strobe illumination 150 that is synchronized with an image capture event performed by camera unit 130. In an alternative embodiment, strobe unit 136 is implemented as an independent device from digital photographic system 100 and configured to provide strobe illumination 150 that is synchronized with an image capture event performed by camera unit 130. Strobe unit 136 may comprise one or more LED devices, one or more Xenon cavity devices, one or more instances of another technically feasible illumination device, or any combination thereof without departing the scope and spirit of the present invention. In one embodiment, strobe unit 136 is directed to either emit illumination or not emit illumination via a strobe control signal 138, which may implement any technically feasible signal transmission protocol. Strobe control signal 138 may also indicate an illumination intensity level.

In one usage scenario, strobe illumination 150 comprises at least a portion of overall illumination in a scene being photographed by camera unit 130. Optical scene information 152, which may include strobe illumination 150 reflected from objects in the scene, is focused onto an image sensor 132 as an optical image. Image sensor 132, within camera unit 130, generates an electronic representation of the optical image. The electronic representation comprises spatial color intensity information, which may include different color intensity samples for red, green, and blue light. In alternative embodiments the color intensity samples may include, without limitation, cyan, magenta, and yellow spatial color intensity information. Persons skilled in the art will recognize that other sets of spatial color intensity information may be implemented without departing the scope of embodiments of the present invention. The electronic representation is transmitted to processor complex 110 via interconnect 134, which may implement any technically feasible signal transmission protocol.

Display unit 112 is configured to display a two-dimensional array of pixels to form a digital image for display. Display unit 112 may comprise a liquid-crystal display, an organic LED display, or any other technically feasible type of display. Input/output devices 114 may include, without limitation, a capacitive touch input surface, a resistive tabled input surface, buttons, knobs, or any other technically feasible device for receiving user input and converting the input to electrical signals. In one embodiment, display unit 112 and a capacitive touch input surface comprise a touch entry display system, and input/output devices 114 comprise a speaker and microphone.

Non-volatile (NV) memory 116 is configured to store data when power is interrupted. In one embodiment, NV memory 116 comprises one or more flash memory devices. NV memory 116 may be configured to include programming instructions for execution by one or more processing units within processor complex 110. The programming instructions may include, without limitation, an operating system (OS), user interface (UI) modules, imaging processing and storage modules, and one or more embodiments of techniques taught herein for generating a digital photograph having proper white balance in both regions illuminated by ambient light and regions illuminated by the strobe unit 136. One or more memory devices comprising NV memory 116 may be packaged as a module that can be installed or removed by a user. In one embodiment, volatile memory 118 comprises dynamic random access memory (DRAM) configured to temporarily store programming instructions, image data, and the like needed during the course of normal operation of digital photographic system 100. Sensor devices 142 may include, without limitation, an accelerometer to detect motion and orientation, an electronic gyroscope to detect motion and orientation, a magnetic flux detector to detect orientation, and a global positioning system (GPS) module to detect geographic position.

Wireless unit 140 may include one or more digital radios configured to send and receive digital data. In particular, wireless unit 140 may implement wireless standards known in the art as "WiFi" based on institute for electrical and electronics engineers (IEEE) standard 802.11, and may implement digital cellular telephony standards for data communication such as the well-known "3G" and "4G" suites of standards. In one embodiment, digital photographic system 100 is configured to transmit one or more digital photographs, generated according to techniques taught herein and residing within either NV memory 116 or volatile memory 118 to an online photographic media service via wireless unit 140. In such a scenario, a user may possess credentials to access the online photographic media service and to transmit the one or more digital photographs for storage and presentation by the online photographic media service. The credentials may be stored or generated within digital photographic system 100 prior to transmission of the digital photographs. The online photographic media service may comprise a social networking service, photograph sharing service, or any other web-based service that provides storage and download of digital photographs. In certain embodiments, one or more digital photographs are generated by the online photographic media service according to techniques taught herein. In such embodiments, a user may upload source images for processing into the one or more digital photographs.

In one embodiment, digital photographic system 100 comprises a plurality of camera units 130 and at least one strobe unit 136 configured to sample multiple views of a scene. In one implementation, the plurality of camera units 130 is configured to sample a wide angle to generate a panoramic photograph. In another implementation, the plurality of camera units 130 is configured to sample two or more narrow angles to generate a stereoscopic photograph.

Figure 1B:
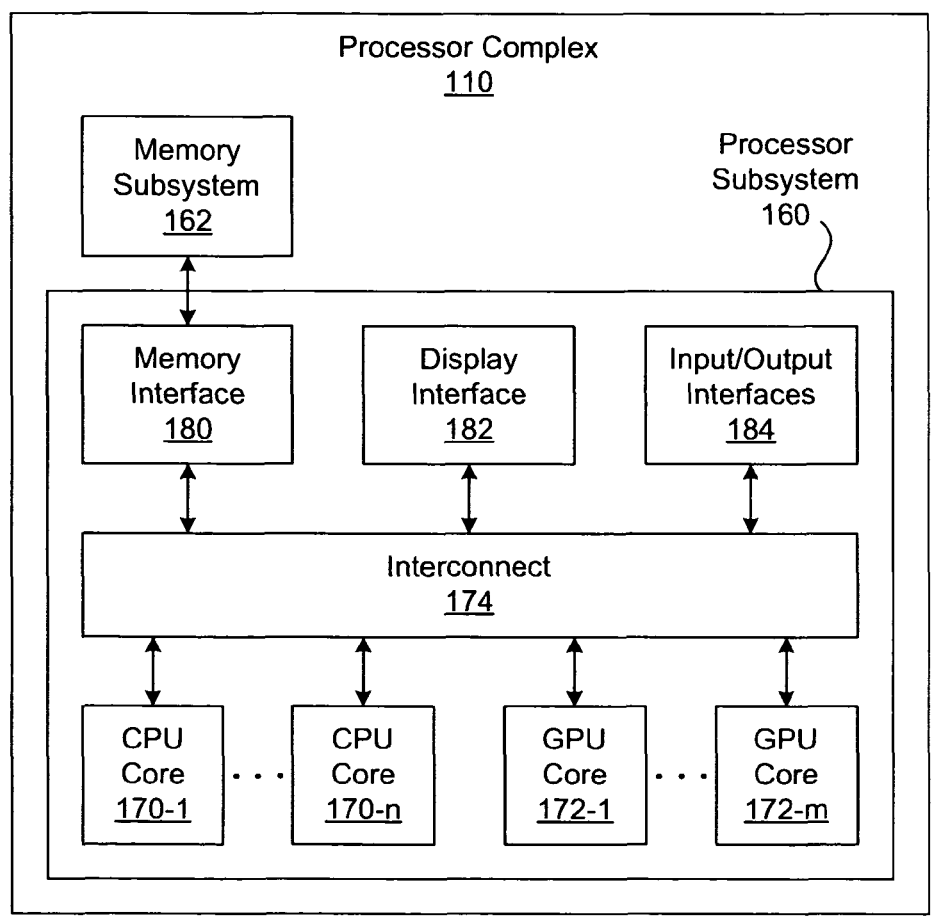
FIG. 1B illustrates a processor complex within the digital photographic system, according to one embodiment of the present invention.

FIG. 1B illustrates a processor complex 110 within digital photographic system 100, according to one embodiment of the present invention. Processor complex 110 includes a processor subsystem 160 and may include a memory subsystem 162. In one embodiment processor subsystem 160 comprises a system on a chip (SoC) die, memory subsystem 162 comprises one or more DRAM dies bonded to the SoC die, and processor complex 110 comprises a multi-chip module (MCM) encapsulating the SoC die and the one or more DRAM dies.

Processor subsystem 160 includes at least one central processing unit (CPU) core 170, a memory interface 180, input/output interfaces unit 184, and a display interface 182 coupled to an interconnect 174. The at least one CPU core 170 is configured to execute instructions residing within memory subsystem 162, volatile memory 118 of FIG. 1A, NV memory 116, or any combination thereof. Each of the at least one CPU core 170 is configured to retrieve and store data via interconnect 174 and memory interface 180. Each CPU core 170 may include a data cache, and an instruction cache. Two or more CPU cores 170 may share a data cache, an instruction cache, or any combination thereof. In one embodiment, a cache hierarchy is implemented to provide each CPU core 170 with a private layer one cache, and a shared layer two cache.

Graphic processing unit (GPU) cores 172 implement graphics acceleration functions. In one embodiment, at least one GPU core 172 comprises a highly-parallel thread processor configured to execute multiple instances of one or more thread programs. GPU cores 172 may be configured to execute multiple thread programs according to well-known standards such as OpenGL™, OpenCL™, CUD™, and the like. In certain embodiments, at least one GPU core 172 implements at least a portion of a motion estimation function, such as a well-known Harris detector or a well-known Hessian-Laplace detector. Persons skilled in the art will recognize that such detectors may be used to provide point pairs for estimating motion between two images and a corresponding affine transform to account for the motion. As discussed in greater detail below, such an affine transform may be useful in performing certain steps related to embodiments of the present invention.

Interconnect 174 is configured to transmit data between and among memory interface 180, display interface 182, input/output interfaces unit 184, CPU cores 170, and GPU cores 172. Interconnect 174 may implement one or more buses, one or more rings, a mesh, or any other technically feasible data transmission structure or technique. Memory interface 180 is configured to couple memory subsystem 162 to interconnect 174. Memory interface 180 may also couple NV memory 116 and volatile memory 118 to interconnect 174. Display interface 182 is configured to couple display unit 112 to interconnect 174. Display interface 182 may implement certain frame buffer functions such as frame refresh. Alternatively, display unit 112 may implement frame refresh. Input/output interfaces unit 184 is configured to couple various input/output devices to interconnect 174.

Figure 1C:
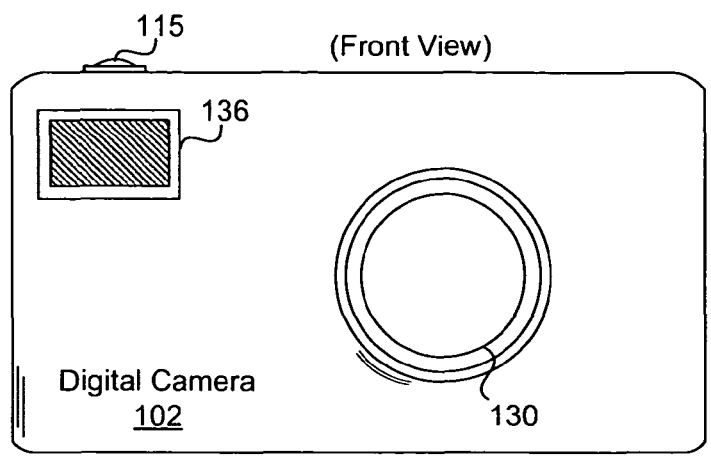
FIG. 1C illustrates a digital camera, according to one embodiment of the present invention.

FIG. 1C illustrates a digital camera 102, according to one embodiment of the present invention. Digital camera 102 comprises digital photographic system 100 packaged as a stand-alone system. As shown, a front lens for camera unit 130 and strobe unit 136 are configured to face in the same direction, allowing strobe unit 136 to illuminate a photographic subject, which camera unit 130 is then able to photograph. Digital camera 102 includes a shutter release button 115 for triggering a capture event to be executed by the camera unit 130. Shutter release button 115 represents an input device comprising input/output devices 114. Other mechanisms may trigger a capture event, such as a timer. In certain embodiments, digital camera 102 may be configured to trigger strobe unit 136 when photographing a subject regardless of available illumination, or to not trigger strobe unit 136 regardless of available illumination, or to automatically trigger strobe unit 136 based on available illumination or other scene parameters.

Figure 1D:
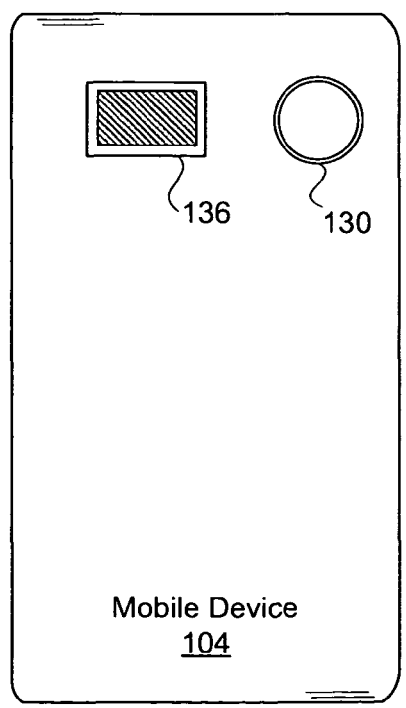
FIG. 1D illustrates a mobile device, according to one embodiment of the present invention.

FIG. 1D illustrates a mobile device 104, according to one embodiment of the present invention. Mobile device 104 comprises digital photographic system 100 and integrates additional functionality, such as cellular mobile telephony. Shutter release functions may be implemented via a mechanical button or via a virtual button, which may be activated by a touch gesture on a touch entry display system within mobile device 104. Other mechanisms may trigger a capture event, such as a remote control configured to transmit a shutter release command, completion of a timer count down, an audio indication, or any other technically feasible user input event.

In alternative embodiments, digital photographic system 100 may comprise a tablet computing device, a reality augmentation device, or any other computing system configured to accommodate at least one instance of camera unit 130 and at least one instance of strobe unit 136.

Figure 2A:
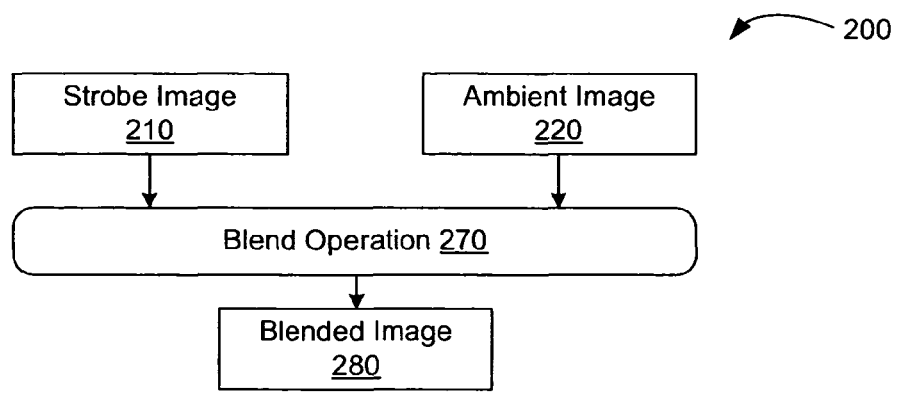
FIG. 2A illustrates a first data flow process for generating a blended image based on at least an ambient image and a strobe image, according to one embodiment of the present invention.

FIG. 2A illustrates a first data flow process 200 for generating a blended image 280 based on at least an ambient image 220 and a strobe image 210, according to one embodiment of the present invention. A strobe image 210 comprises a digital photograph sampled by camera unit 130 while strobe unit 136 is actively emitting strobe illumination 150. Ambient image 220 comprises a digital photograph sampled by camera unit 130 while strobe unit 136 is inactive and substantially not emitting strobe illumination 150.

In one embodiment, ambient image 220 is generated according to a prevailing ambient white balance for a scene being photographed. The prevailing ambient white balance may be computed using the well-known gray world model, an illuminator matching model, or any other technically feasible technique. Strobe image 210 should be generated according to an expected white balance for strobe illumination 150, emitted by strobe unit 136. Blend operation 270, discussed in greater detail below, blends strobe image 210 and ambient image 220 to generate a blended image 280 via preferential selection of image data from strobe image 210 in regions of greater intensity compared to corresponding regions of ambient image 220.

In one embodiment, data flow process 200 is performed by processor complex 110 within digital photographic system 100, and blend operation 270 is performed by at least one GPU core 172, one CPU core 170, or any combination thereof.

Figure 2B:
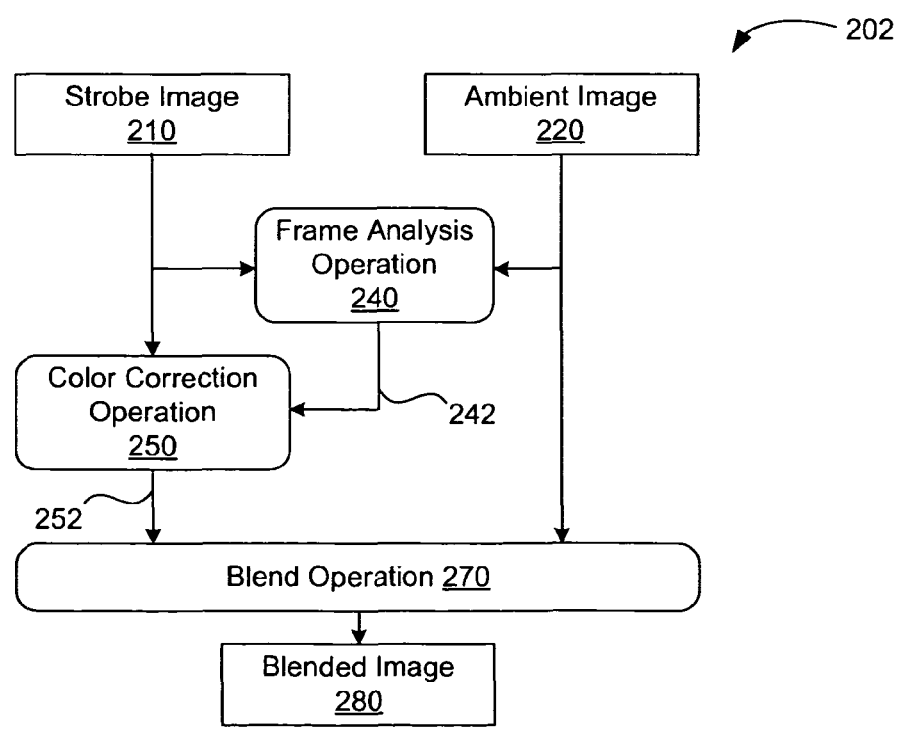
FIG. 2B illustrates a second data flow process for generating a blended image based on at least an ambient image and a strobe image, according to one embodiment of the present invention.

FIG. 2B illustrates a second data flow process 202 for generating a blended image 280 based on at least an ambient image 220 and a strobe image 210, according to one embodiment of the present invention. Strobe image 210 comprises a digital photograph sampled by camera unit 130 while strobe unit 136 is actively emitting strobe illumination 150. Ambient image 220 comprises a digital photograph sampled by camera unit 130 while strobe unit 136 is inactive and substantially not emitting strobe illumination 150.

In one embodiment, ambient image 220 is generated according to a prevailing ambient white balance for a scene being photographed. The prevailing ambient white balance may be computed using the well-known gray world model, an illuminator matching model, or any other technically feasible technique. In certain embodiments, strobe image 210 is generated according to the prevailing ambient white balance. In an alternative embodiment ambient image 220 is generated according to a prevailing ambient white balance, and strobe image 210 is generated according to an expected white balance for strobe illumination 150, emitted by strobe unit 136.

In other embodiments, ambient image 220 and strobe image 210 comprise raw image data, having no white balance operation applied to either. Blended image 280 may be subjected to arbitrary white balance operations, as is common practice with raw image data, while advantageously retaining color consistency between regions dominated by ambient illumination and regions dominated by strobe illumination.

As a consequence of color balance differences between ambient illumination, which may dominate certain portions of strobe image 210 and strobe illumination 150, which may dominate other portions of strobe image 210, strobe image 210 may include color information in certain regions that is discordant with color information for the same regions in ambient image 220. Frame analysis operation 240 and color correction operation 250 together serve to reconcile discordant color information within strobe image 210. Frame analysis operation 240 generates color correction data 242, described in greater detail below, for adjusting color within strobe image 210 to converge spatial color characteristics of strobe image 210 to corresponding spatial color characteristics of ambient image 220. Color correction operation 250 receives color correction data 242 and performs spatial color adjustments to generate corrected strobe image data 252 from strobe image 210. Blend operation 270, discussed in greater detail below, blends corrected strobe image data 252 with ambient image 220 to generate blended image 280. Color correction data 242 may be generated to completion prior to color correction operation 250 being performed. Alternatively, certain portions of color correction data 242, such as spatial correction factors, may be generated as needed.

In one embodiment, data flow process 202 is performed by processor complex 110 within digital photographic system 100. In certain implementations, blend operation 270 and color correction operation 250 are performed by at least one GPU core 172, at least one CPU core 170, or a combination thereof. Portions of frame analysis operation 240 may be performed by at least one GPU core 172, one CPU core 170, or any combination thereof. Frame analysis operation 240 and color correction operation 250 are discussed in greater detail below.

Figure 2C:
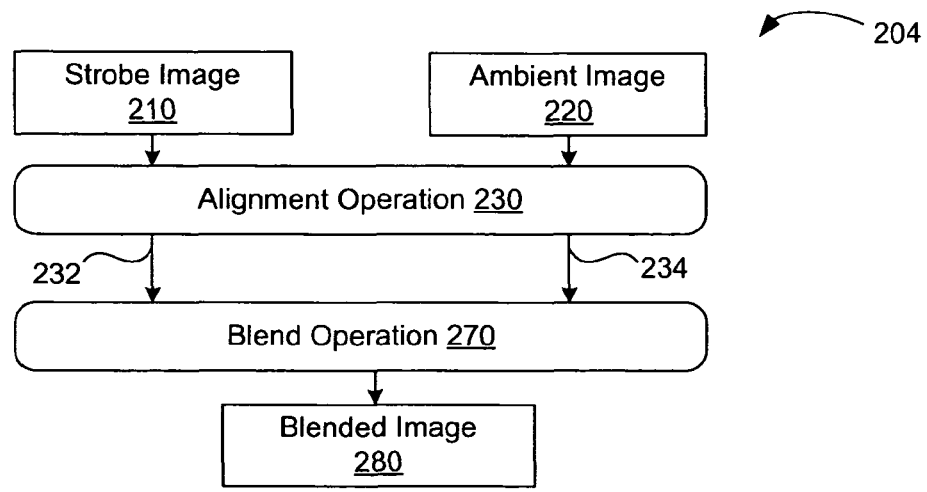
FIG. 2C illustrates a third data flow process for generating a blended image based on at least an ambient image and a strobe image, according to one embodiment of the present invention.

FIG. 2C illustrates a third data flow process 204 for generating a blended image 280 based on at least an ambient image 220 and a strobe image 210, according to one embodiment of the present invention. Strobe image 210 comprises a digital photograph sampled by camera unit 130 while strobe unit 136 is actively emitting strobe illumination 150. Ambient image 220 comprises a digital photograph sampled by camera unit 130 while strobe unit 136 is inactive and substantially not emitting strobe illumination 150.

In one embodiment, ambient image 220 is generated according to a prevailing ambient white balance for a scene being photographed. The prevailing ambient white balance may be computed using the well-known gray world model, an illuminator matching model, or any other technically feasible technique. Strobe image 210 should be generated according to an expected white balance for strobe illumination 150, emitted by strobe unit 136.

In certain common settings, camera unit 130 is packed into a hand-held device, which may be subject to a degree of involuntary random movement or "shake" while being held in a user's hand. In these settings, when the hand-held device sequentially samples two images, such as strobe image 210 and ambient image 220, the effect of shake may cause misalignment between the two images. The two images should be aligned prior to blend operation 270, discussed in greater detail below. Alignment operation 230 generates an aligned strobe image 232 from strobe image 210 and an aligned ambient image 234 from ambient image 220. Alignment operation 230 may implement any technically feasible technique for aligning images or sub-regions.

In one embodiment, alignment operation 230 comprises an operation to detect point pairs between strobe image 210 and ambient image 220, an operation to estimate an affine or related transform needed to substantially align the point pairs. Alignment may then be achieved by executing an operation to resample strobe image 210 according to the affine transform thereby aligning strobe image 210 to ambient image 220, or by executing an operation to resample ambient image 220 according to the affine transform thereby aligning ambient image 220 to strobe image 210. Aligned images typically overlap substantially with each other, but may also have non-overlapping regions. Image information may be discarded from non-overlapping regions during an alignment operation. Such discarded image information should be limited to relatively narrow boundary regions. In certain embodiments, resampled images are normalized to their original size via a scaling operation performed by one or more GPU cores 172.

In one embodiment, the point pairs are detected using a technique known in the art as a Harris affine detector. The operation to estimate an affine transform may compute a substantially optimal affine transform between the detected point pairs, comprising pairs of reference points and offset points. In one implementation, estimating the affine transform comprises computing a transform solution that minimizes a sum of distances between each reference point and each offset point subjected to the transform. Persons skilled in the art will recognize that these and other techniques may be implemented for performing the alignment operation 230 without departing the scope and spirit of the present invention.

In one embodiment, data flow process 204 is performed by processor complex 110 within digital photographic system 100. In certain implementations, blend operation 270 and resampling operations are performed by at least one GPU core.

Figure 2D:
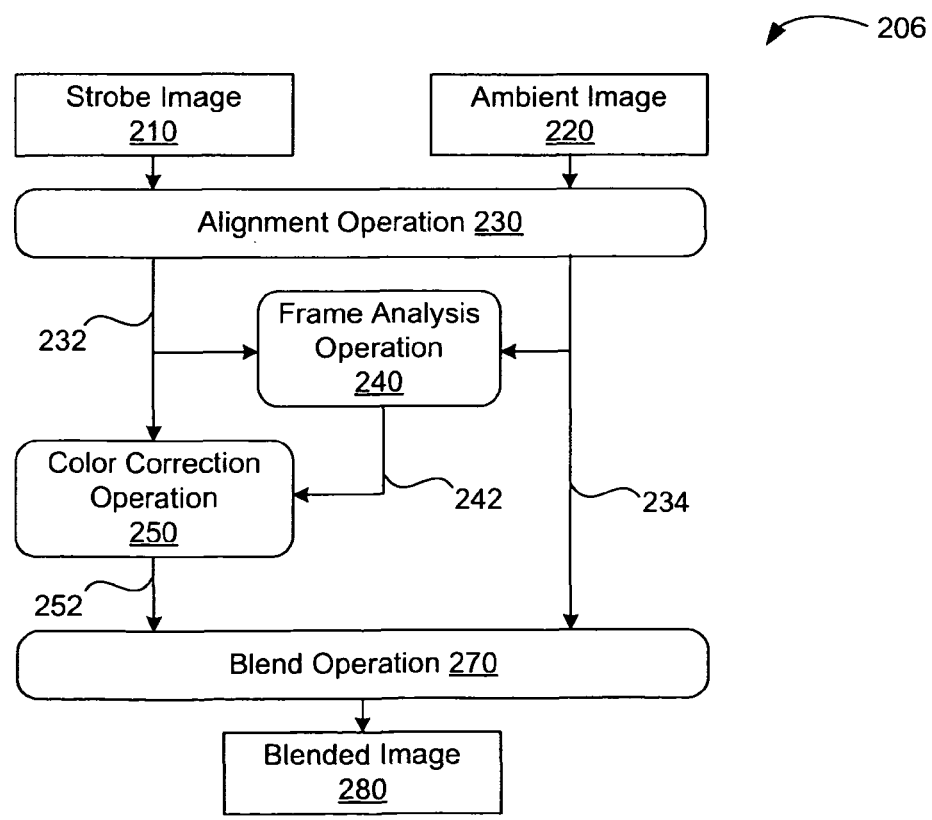
FIG. 2D illustrates a fourth data flow process for generating a blended image based on at least an ambient image and a strobe image, according to one embodiment of the present invention.

FIG. 2D illustrates a fourth data flow process 206 for generating a blended image 280 based on at least an ambient image 220 and a strobe image 210, according to one embodiment of the present invention. Strobe image 210 comprises a digital photograph sampled by camera unit 130 while strobe unit 136 is actively emitting strobe illumination 150. Ambient image 220 comprises a digital photograph sampled by camera unit 130 while strobe unit 136 is inactive and substantially not emitting strobe illumination 150.

In one embodiment, ambient image 220 is generated according to a prevailing ambient white balance for a scene being photographed. The prevailing ambient white balance may be computed using the well-known gray world model, an illuminator matching model, or any other technically feasible technique. In certain embodiments, strobe image 210 is generated according to the prevailing ambient white balance. In an alternative embodiment ambient image 220 is generated according to a prevailing ambient white balance, and strobe image 210 is generated according to an expected white balance for strobe illumination 150, emitted by strobe unit 136. In other embodiments, ambient image 220 and strobe image 210 comprise raw image data, having no white balance operation applied to either. Blended image 280 may be subjected to arbitrary white balance operations, as is common practice with raw image data, while advantageously retaining color consistency between regions dominated by ambient illumination and regions dominated by strobe illumination.

Alignment operation 230, discussed previously in FIG. 2C, generates an aligned strobe image 232 from strobe image 210 and an aligned ambient image 234 from ambient image 220. Alignment operation 230 may implement any technically feasible technique for aligning images.

Frame analysis operation 240 and color correction operation 250, both discussed previously in FIG. 2B, operate together to generate corrected strobe image data 252 from aligned strobe image 232. Blend operation 270, discussed in greater detail below, blends corrected strobe image data 252 with ambient image 220 to generate blended image 280.

Color correction data 242 may be generated to completion prior to color correction operation 250 being performed. Alternatively, certain portions of color correction data 242, such as spatial correction factors, may be generated as needed. In one embodiment, data flow process 206 is performed by processor complex 110 within digital photographic system 100.

While frame analysis operation 240 is shown operating on aligned strobe image 232 and aligned ambient image 234, certain global correction factors may be computed from strobe image 210 and ambient image 220. For example, in one embodiment, a frame level color correction factor, discussed below, may be computed from strobe image 210 and ambient image 220. In such an embodiment the frame level color correction may be advantageously computed in parallel with alignment operation 230, reducing overall time required to generate blended image 280.

In certain embodiments, strobe image 210 and ambient image 220 are partitioned into two or more tiles and color correction operation 250, blend operation 270, and resampling operations comprising alignment operation 230 are performed on a per tile basis before being combined into blended image 280. Persons skilled in the art will recognize that tiling may advantageously enable finer grain scheduling of computational tasks among CPU cores 170 and GPU cores 172. Furthermore, tiling enables GPU cores 172 to advantageously operate on images having higher resolution in one or more dimensions than native two-dimensional surface support may allow for the GPU cores. For example, certain generations of GPU core are only configured to operate on 2048 by 2048 pixel images, but popular mobile devices include camera resolution of more than 2048 in one dimension and less than 2048 in another dimension. In such a system, two tiles may be used to partition strobe image 210 and ambient image 220 into two tiles each, thereby enabling a GPU having a resolution limitation of 2048 by 2048 to operate on the images. In one embodiment, a first tile of blended image 280 is computed to completion before a second tile for blended image 280 is computed, thereby reducing peak system memory required by processor complex 110.

Figure 3A:
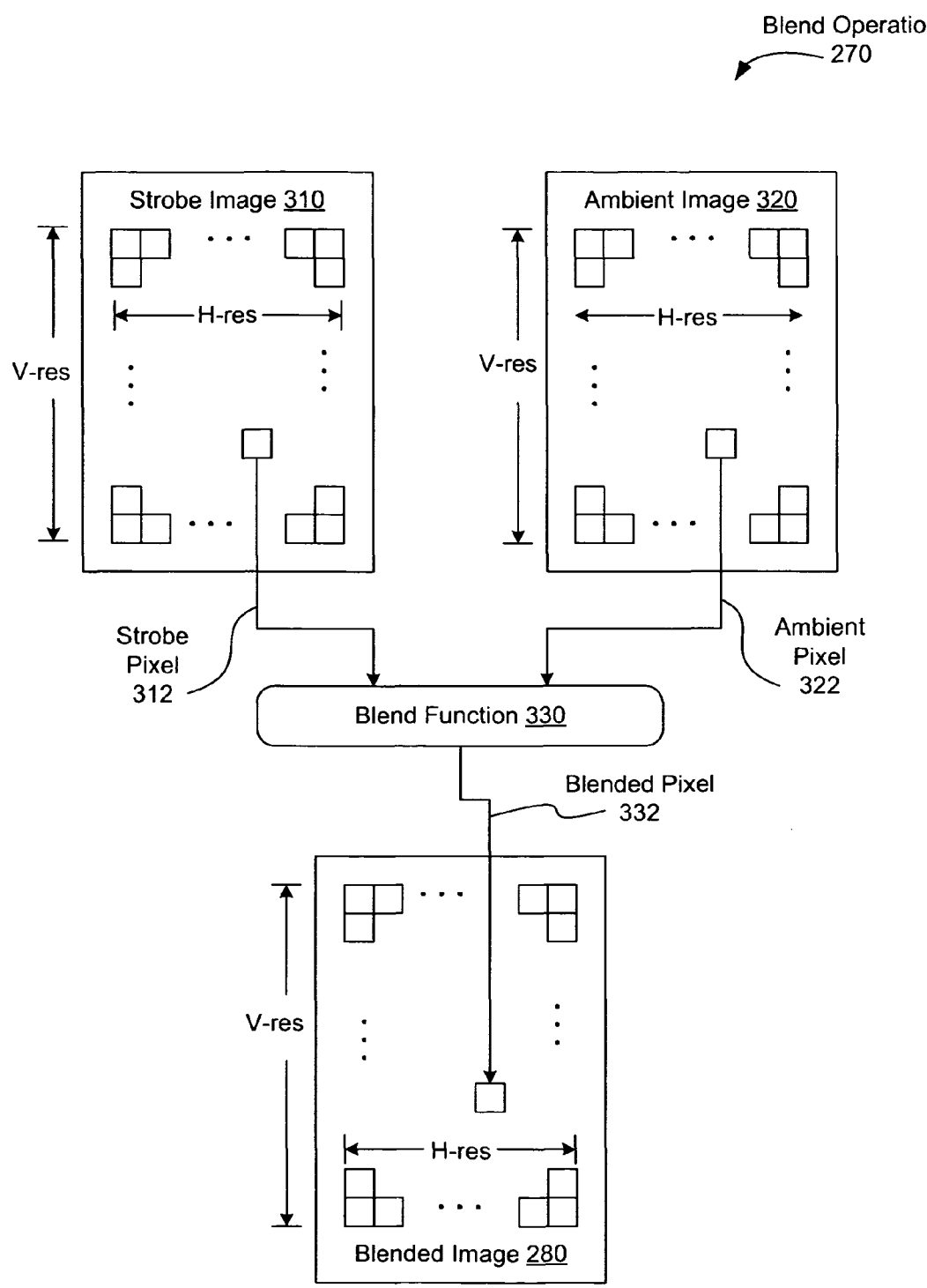
FIG. 3A illustrates an image blend operation for blending a strobe image with an ambient image to generate a blended image, according to one embodiment of the present invention.

FIG. 3A illustrates image blend operation 270, according to one embodiment of the present invention. A strobe image 310 and an ambient image 320 of the same horizontal resolution (H-res) and vertical resolution (V-res) are combined via blend function 330 to generate blended image 280 having the same horizontal resolution and vertical resolution. In alternative embodiments, strobe image 310 or ambient image 320, or both images may be scaled to an arbitrary resolution defined by blended image 280 for processing by blend function 330. Blend function 330 is described in greater detail below in FIGS. 3B-3D.

As shown, strobe pixel 312 and ambient pixel 322 are blended by blend function 330 to generate blended pixel 332, stored in blended image 280. Strobe pixel 312, ambient pixel 322, and blended pixel 332 are located in substantially identical locations in each respective image.

In one embodiment, strobe image 310 corresponds to strobe image 210 of FIG. 2A and ambient image 320 corresponds to ambient image 220. In another embodiment, strobe image 310 corresponds to corrected strobe image data 252 of FIG. 2B and ambient image 320 corresponds to ambient image 220. In yet another embodiment, strobe image 310 corresponds to aligned strobe image 232 of FIG. 2C and ambient image 320 corresponds to aligned ambient image 234. In still yet another embodiment, strobe image 310 corresponds to corrected strobe image data 252 of FIG. 2D, and ambient image 320 corresponds to aligned ambient image 234.

Blend operation 270 may be performed by one or more CPU cores 170, one or more GPU cores 172, or any combination thereof. In one embodiment, blend function 330 is associated with a fragment shader, configured to execute within one or more GPU cores 172.

Figure 3B:
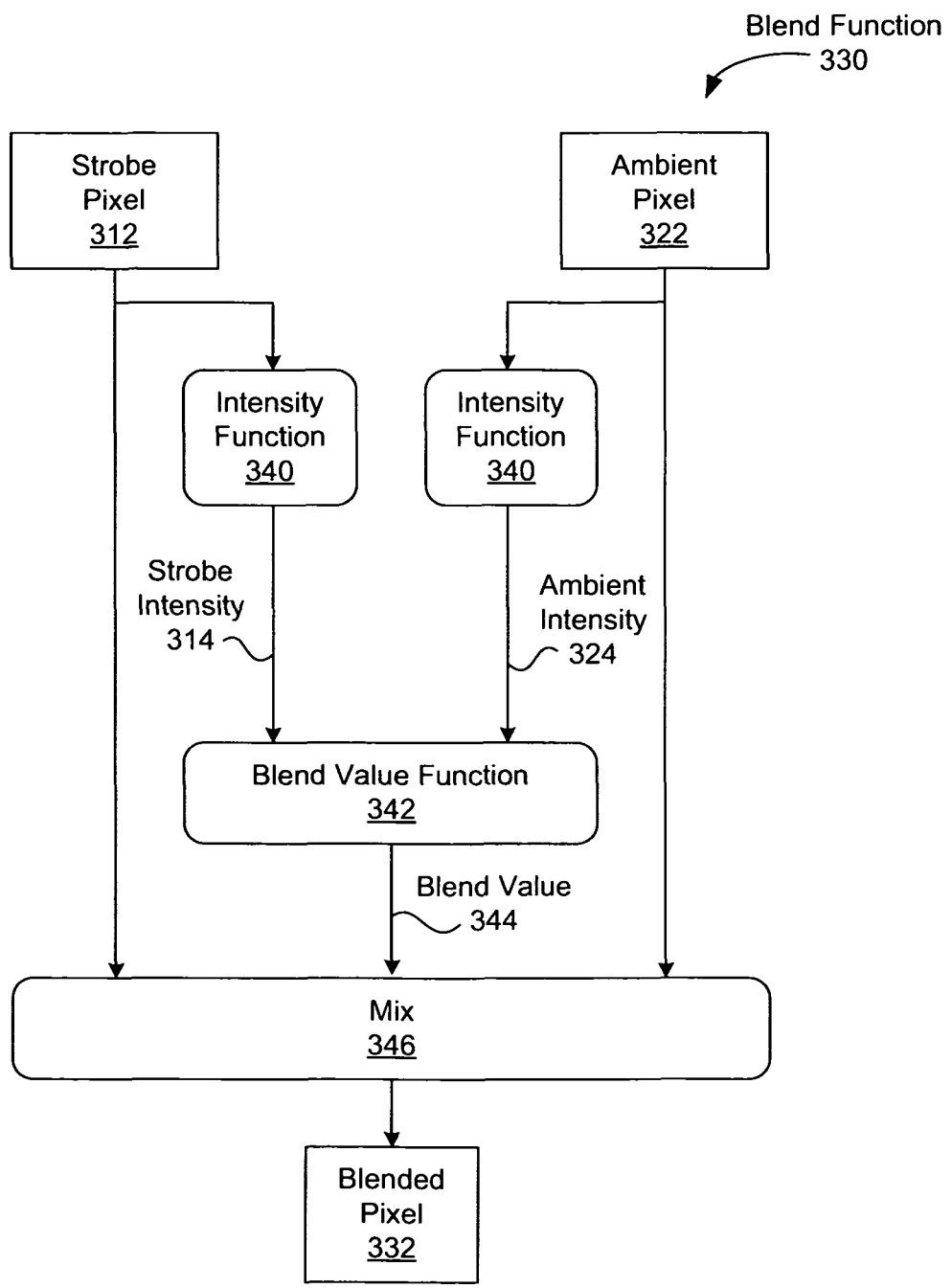
FIG. 3B illustrates a blend function for blending pixels associated with a strobe image and an ambient image, according to one embodiment of the present invention.

FIG. 3B illustrates blend function 330 of FIG. 3A for blending pixels associated with a strobe image and an ambient image, according to one embodiment of the present invention. As shown, a strobe pixel 312 from strobe image 310 and an ambient pixel 322 from ambient image 320 are blended to generate a blended pixel 332 associated with blended image 280.

Strobe intensity 314 is calculated for strobe pixel 312 by intensity function 340. Similarly, ambient intensity 324 is calculated by intensity function 340 for ambient pixel 322. In one embodiment, intensity function 340 implements Equation 1, where Cr, Cg, Cb are contribution constants and Red, Green, and Blue represent color intensity values for an associated pixel:

$$\text{Intensity} = Cr*\text{Red} + Cg*\text{Green} + Cb*\text{Blue} \quad \text{(Eq. 1)}$$

A sum of the contribution constants should be equal to a maximum range value for Intensity. For example, if Intensity is defined to range from 0.0 to 1.0, then $Cr+Cg+Cb=1.0$. In one embodiment $Cr=Cg=Cb=\frac{1}{3}$.

Blend value function 342 receives strobe intensity 314 and ambient intensity 324 and generates a blend value 344. Blend value function 342 is described in greater detail in FIGS. 3D and 3C. In one embodiment, blend value 344 controls a linear mix operation 346 between strobe pixel 312 and ambient pixel 322 to generate blended pixel 332. Linear mix operation 346 receives Red, Green, and Blue values for strobe pixel 312 and ambient pixel 322. Linear mix operation 346 receives blend value 344, which determines how much strobe pixel 312 versus how much ambient pixel 322 will be represented in blended pixel 332. In one embodiment, linear mix operation 346 is defined by equation 2, where Out corresponds to blended pixel 332, Blend corresponds to blend value 344, "A" corresponds to a color vector comprising ambient pixel 322, and "B" corresponds to a color vector comprising strobe pixel 312.

$$\text{Out} = (\text{Blend}*B) + (1.0 - \text{Blend})*A \quad \text{(Eq. 2)}$$

When blend value 344 is equal to 1.0, blended pixel 332 is entirely determined by strobe pixel 312. When blend value 344 is equal to 0.0, blended pixel 332 is entirely determined by ambient pixel 322. When blend value 344 is equal to 0.5, blended pixel 332 represents a per component average between strobe pixel 312 and ambient pixel 322.

Figure 3C:
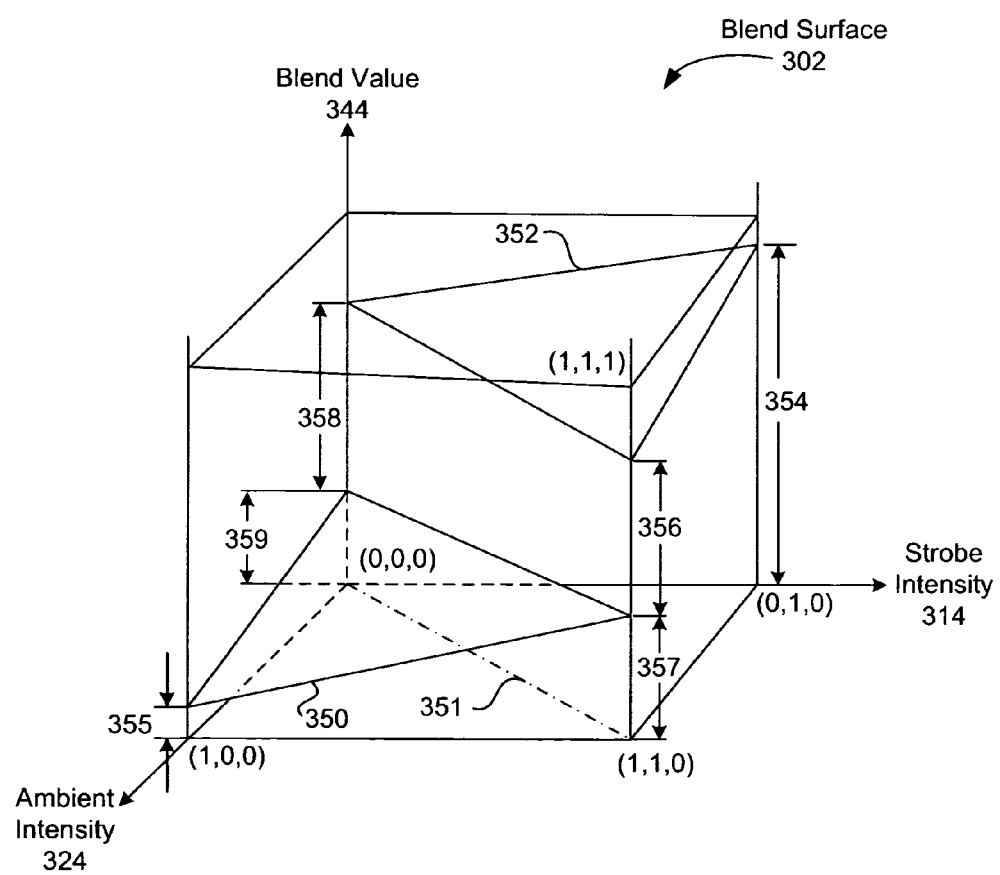
FIG. 3C illustrates a blend surface for blending two pixels, according to one embodiment of the present invention.

FIG. 3C illustrates a blend surface 302 for blending two pixels, according to one embodiment of the present invention. In one embodiment, blend surface 302 defines blend value function 342 of FIG. 3B. Blend surface 302 comprises a strobe dominant region 352 and an ambient dominant region 350 within a coordinate system defined by an axis for each of ambient intensity 324, strobe intensity 314, and blend value 344. Blend surface 302 is defined within a volume where ambient intensity 324, strobe intensity 314, and blend value 344 may range from 0.0 to 1.0. Persons skilled in the art will recognize that a range of 0.0 to 1.0 is arbitrary and other numeric ranges may be implemented without departing the scope and spirit of the present invention.

When ambient intensity 324 is larger than strobe intensity 314, blend value 344 may be defined by ambient dominant region 350. Otherwise, when strobe intensity 314 is larger than ambient intensity 324, blend value 344 may be defined by strobe dominant region 352. Diagonal 351 delineates a boundary between ambient dominant region 350 and strobe dominant region 352, where ambient intensity 324 is equal to strobe intensity 314. As shown, a discontinuity of blend value 344 in blend surface 302 is implemented along diagonal 351, separating ambient dominant region 350 and strobe dominant region 352.

For simplicity, a particular blend value 344 for blend surface 302 will be described herein as having a height above a plane that intersects three points including points at (1,0,0), (0,1,0), and the origin (0,0,0). In one embodiment, ambient dominant region 350 has a height 359 at the origin and strobe dominant region 352 has a height 358 above height 359. Similarly, ambient dominant region 350 has a height 357 above the plane at location (1,1), and strobe dominant region 352 has a height 356 above height 357 at location (1,1). Ambient dominant region 350 has a height 355 at location (1,0) and strobe dominant region 352 has a height of 354 at location (0,1).

In one embodiment, height 355 is greater than 0.0, and height 354 is less than 1.0. Furthermore, height 357 and height 359 are greater than 0.0 and height 356 and height 358 are each greater than 0.25. In certain embodiments, height 355 is not equal to height 359 or height 357. Furthermore, height 354 is not equal to the sum of height 356 and height 357, nor is height 354 equal to the sum of height 358 and height 359.

The height of a particular point within blend surface 302 defines blend value 344, which then determines how much strobe pixel 312 and ambient pixel 322 each contribute to blended pixel 332. For example, at location (0,1), where ambient intensity is 0.0 and strobe intensity is 1.0, the height of blend surface 302 is given as height 354, which sets blend value 344 to a value for height 354. This value is used as blend value 344 in mix operation 346 to mix strobe pixel 312 and ambient pixel 322. At (0,1), strobe pixel 312 dominates the value of blended pixel 332, with a remaining, small portion of blended pixel 322 contributed by ambient pixel 322. Similarly, at (1,0), ambient pixel 322 dominates the value of blended pixel 332, with a remaining, small portion of blended pixel 322 contributed by strobe pixel 312.

Figure 3D:
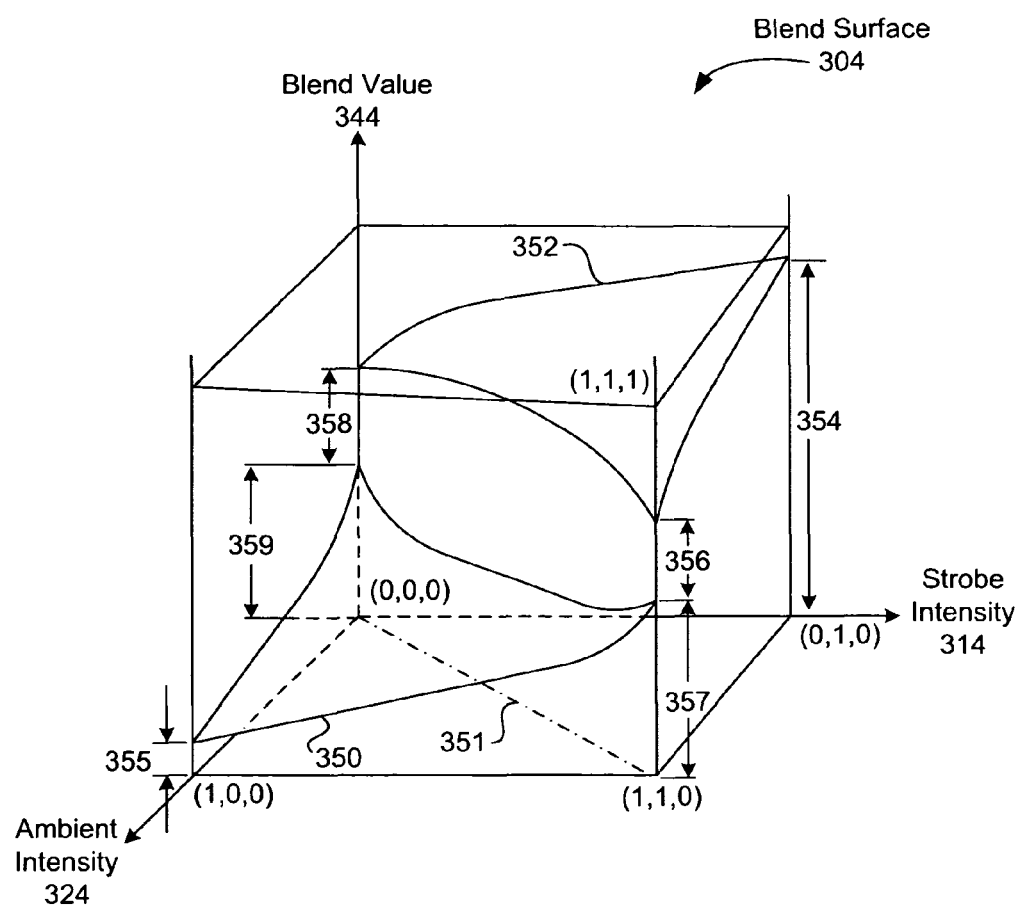
FIG. 3D illustrates a blend surface for blending two pixels, according to another embodiment of the present invention.

Ambient dominant region 350 and strobe dominant region 352 are illustrated herein as being planar sections for simplicity. However, as shown in FIG. 3D, certain curvature may be added, for example, to provide smoother transitions, such as along at least portions of diagonal 351, where strobe pixel 312 and ambient pixel 322 have similar intensity. A gradient, such as a table top or a wall in a given scene, may include a number of pixels that cluster along diagonal 351. These pixels may look more natural if the height difference between ambient dominant region 350 and strobe dominant region 352 along diagonal 351 is reduced compared to a planar section. A discontinuity along diagonal 351 is generally needed to distinguish pixels that should be strobe dominant versus pixels that should be ambient dominant. A given quantization of strobe intensity 314 and ambient intensity 324 may require a certain bias along diagonal 351, so that either ambient dominant region 350 or strobe dominant region 352 comprises a larger area within the plane than the other.

FIG. 3D illustrates a blend surface 304 for blending two pixels, according to another embodiment of the present invention. Blend surface 304 comprises a strobe dominant region 352 and an ambient dominant region 350 within a coordinate system defined by an axis for each of ambient intensity 324, strobe intensity 314, and blend value 344. Blend surface 304 is defined within a volume substantially identical to blend surface 302 of FIG. 3C.

As shown, upward curvature at locations (0,0) and (1,1) is added to ambient dominant region 350, and downward curvature at locations (0,0) and (1,1) is added to strobe dominant region 352. As a consequence, a smoother transition may be observed within blended image 280 for very bright and very dark regions, where color may be less stable and may diverge between strobe image 310 and ambient image 320. Upward curvature may be added to ambient dominant region 350 along diagonal 351 and corresponding downward curvature may be added to strobe dominant region 352 along diagonal 351.

In certain embodiments, downward curvature may be added to ambient dominant region 350 at (1,0), or along a portion of the axis for ambient intensity 324. Such downward curvature may have the effect of shifting the weight of mix operation 346 to favor ambient pixel 322 when a corresponding strobe pixel 312 has very low intensity.

In one embodiment, a blend surface, such as blend surface 302 or blend surface 304, is pre-computed and stored as a texture map that is established as an input to a fragment shader configured to implement blend operation 270. A surface function that describes a blend surface having an ambient dominant region 350 and a strobe dominant region 352 is implemented to generate and store the texture map. The surface function may be implemented on a CPU core 170 of FIG. 1A or a GPU core 172, or a combination thereof. The fragment shader executing on a GPU core may use the texture map as a lookup table implementation of blend value function 342. In alternative embodiments, the fragment shader implements the surface function and computes a blend value 344 as needed for each combination of a strobe intensity 314 and an ambient intensity 324. One exemplary surface function that may be used to compute a blend value 344 (blendValue) given an ambient intensity 324 (ambient) and a strobe intensity 314 (strobe) is illustrated below as pseudo-code in Table 1. A constant "e" is set to a value that is relatively small, such as a fraction of a quantization step for ambient or strobe intensity, to avoid dividing by zero. Height 355 corresponds to constant 0.125 divided by 3.0.

TABLE 1

| |
|---|
| fDivA = strobe/(ambient + e); |
| fDivB = (1.0 − ambient) / ((1.0 − strobe) + (1.0 − ambient) + e) |
| temp = (fDivA >= 1.0) ? 1.0 : 0.125; |
| blendValue = (temp + 2.0 * fDivB) / 3.0; |

In certain embodiments, the blend surface is dynamically configured based on image properties associated with a given strobe image 310 and corresponding ambient image 320. Dynamic configuration of the blend surface may include, without limitation, altering one or more of heights 354 through 359, altering curvature associated with one or more of heights 354 through 359, altering curvature along diagonal 351 for ambient dominant region 350, altering curvature along diagonal 351 for strobe dominant region 352, or any combination thereof.

One embodiment of dynamic configuration of a blend surface involves adjusting heights associated with the surface discontinuity along diagonal 351. Certain images disproportionately include gradient regions having strobe pixels 312 and ambient pixels 322 of similar or identical intensity. Regions comprising such pixels may generally appear more natural as the surface discontinuity along diagonal 351 is reduced. Such images may be detected using a heat-map of ambient intensity 324 and strobe intensity 314 pairs within a surface defined by ambient intensity 324 and strobe intensity 314. Clustering along diagonal 351 within the heat-map indicates a large incidence of strobe pixels 312 and ambient pixels 322 having similar intensity within an associated scene. In one embodiment, clustering along diagonal 351 within the heat-map indicates that the blend surface should be dynamically configured to reduce the height of the discontinuity along diagonal 351. Reducing the height of the discontinuity along diagonal 351 may be implemented via adding downward curvature to strobe dominant region 352 along diagonal 351, adding upward curvature to ambient dominant region 350 along diagonal 351, reducing height 358, reducing height 356, or any combination thereof. Any technically feasible technique may be implemented to adjust curvature and height values without departing the scope and spirit of the present invention. Furthermore, any region of blend surfaces 302, 304 may be dynamically adjusted in response to image characteristics without departing the scope of the present invention.

In one embodiment, dynamic configuration of the blend surface comprises mixing blend values from two or more pre-computed lookup tables implemented as texture maps. For example, a first blend surface may reflect a relatively large discontinuity and relatively large values for heights 356 and 358, while a second blend surface may reflect a relatively small discontinuity and relatively small values for height 356 and 358. Here, blend surface 304 may be dynamically configured as a weighted sum of blend values from the first blend surface and the second blend surface. Weighting may be determined based on certain image characteristics, such as clustering of strobe intensity 314 and ambient intensity 324 pairs in certain regions within the surface defined by strobe intensity 314 and ambient intensity 324, or certain histogram attributes for strobe image 210 and ambient image 220. In one embodiment, dynamic configuration of one or more aspects of the blend surface, such as discontinuity height, may be adjusted according to direct user input, such as via a UI tool.

Figure 3E:
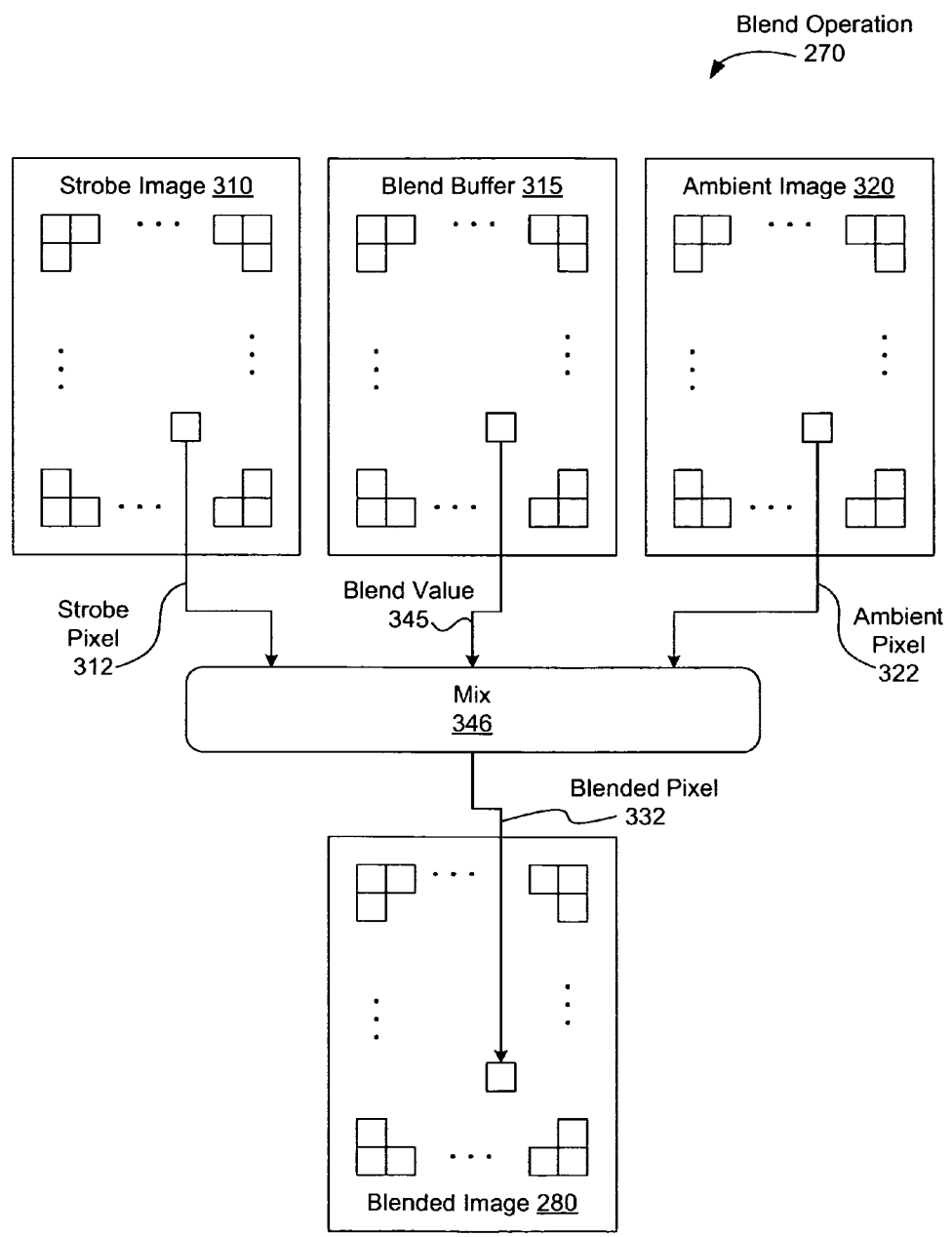
FIG. 3E illustrates an image blend operation for blending a strobe image with an ambient image to generate a blended image, according to one embodiment of the present invention.

FIG. 3E illustrates an image blend operation for blending a strobe image with an ambient image to generate a blended image, according to one embodiment of the present invention. A strobe image 310 and an ambient image 320 of the same horizontal resolution and vertical resolution are combined via mix operation 346 to generate blended image 280 having the same resolution horizontal resolution and vertical resolution. In alternative embodiments, strobe image 310 or ambient image 320, or both images may be scaled to an arbitrary resolution defined by blended image 280 for processing by mix operation 346.

In certain settings, strobe image 310 and ambient image 320 include a region of pixels having similar intensity per pixel but different color per pixel. Differences in color may be attributed to differences in white balance for each image and different illumination contribution for each image. Because the intensity among adjacent pixels is similar, pixels within the region will cluster along diagonal 351 of FIGS. 3D and 3C, resulting in a distinctly unnatural speckling effect as adjacent pixels are weighted according to either strobe dominant region 352 or ambient dominant region 350. To soften this speckling effect and produce a natural appearance within these regions, blend values may be blurred, effectively reducing the discontinuity between strobe dominant region 352 and ambient dominant region 350. As is well-known in the art, blurring may be implemented by combining two or more individual samples.

In one embodiment, a blend buffer 315 comprises blend values 345, which are computed from a set of two or more blend samples. Each blend sample is computed according to blend function 330, described previously in FIGS. 3B-3D. In one embodiment, blend buffer 315 is first populated with blend samples, computed according to blend function 330. The blend samples are then blurred to compute each blend value 345, which is stored to blend buffer 315. In other embodiments, a first blend buffer is populated with blend samples computed according to blend function 330, and two or more blend samples from the first blend buffer are blurred together to generate blend each value 345, which is stored in blend buffer 315. In yet other embodiments, two or more blend samples from the first blend buffer are blurred together to generate each blend value 345 as needed. In still another embodiment, two or more pairs of strobe pixels 312 and ambient pixels 322 are combined to generate each blend value 345 as needed. Therefore, in certain embodiments, blend buffer 315 comprises an allocated buffer in memory, while in other embodiments blend buffer 315 comprises an illustrative abstraction with no corresponding allocation in memory.

As shown, strobe pixel 312 and ambient pixel 322 are mixed based on blend value 345 to generate blended pixel 332, stored in blended image 280. Strobe pixel 312, ambient pixel 322, and blended pixel 332 are located in substantially identical locations in each respective image.

In one embodiment, strobe image 310 corresponds to strobe image 210 and ambient image 320 corresponds to ambient image 220. In other embodiments, strobe image 310 corresponds to aligned strobe image 232 and ambient image 320 corresponds to aligned ambient image 234. In one embodiment, mix operation 346 is associated with a fragment shader, configured to execute within one or more GPU cores 172.

Figure 4A:
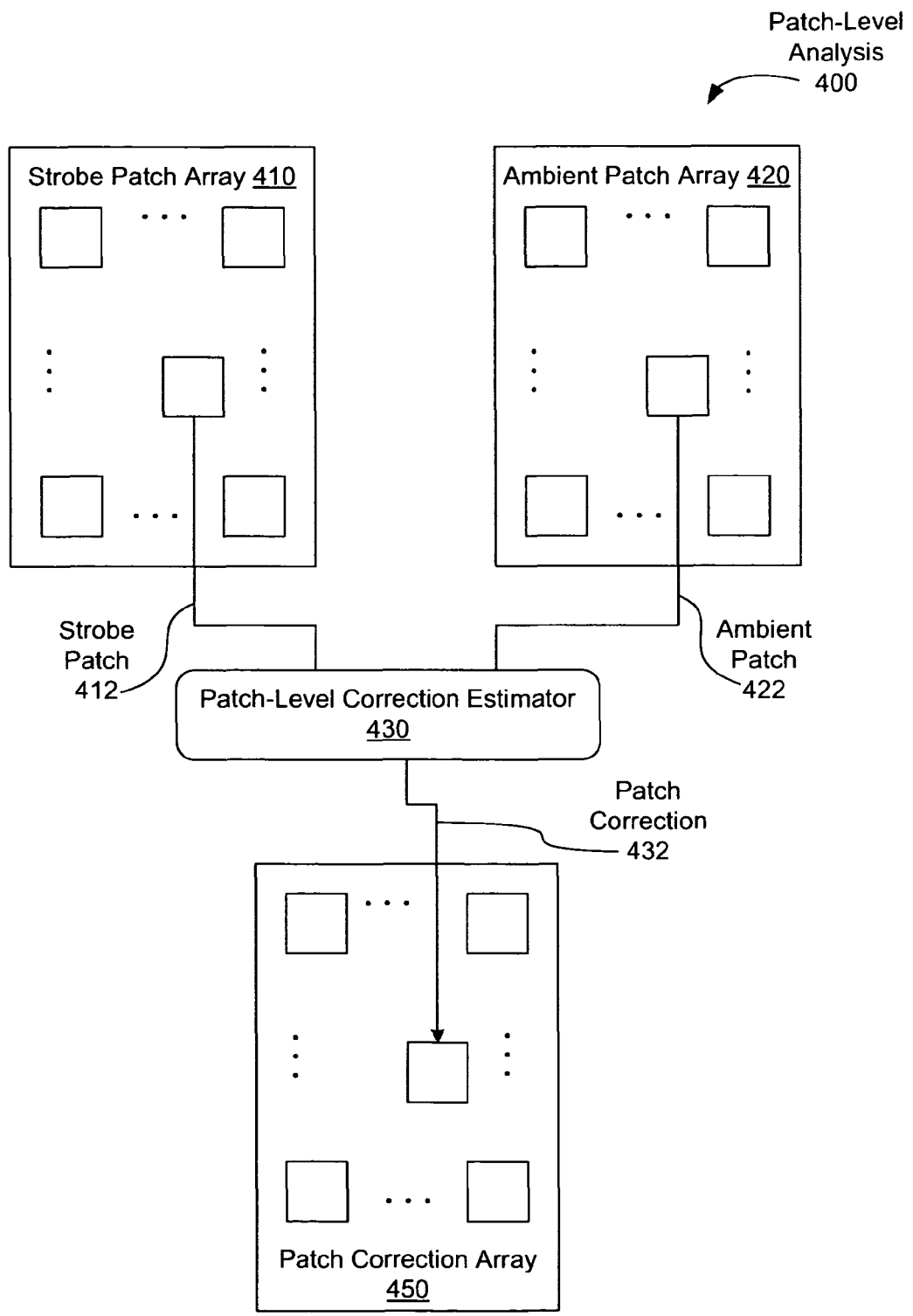
FIG. 4A illustrates a patch-level analysis process for generating a patch correction array, according to one embodiment of the present invention.
Figure 4B:
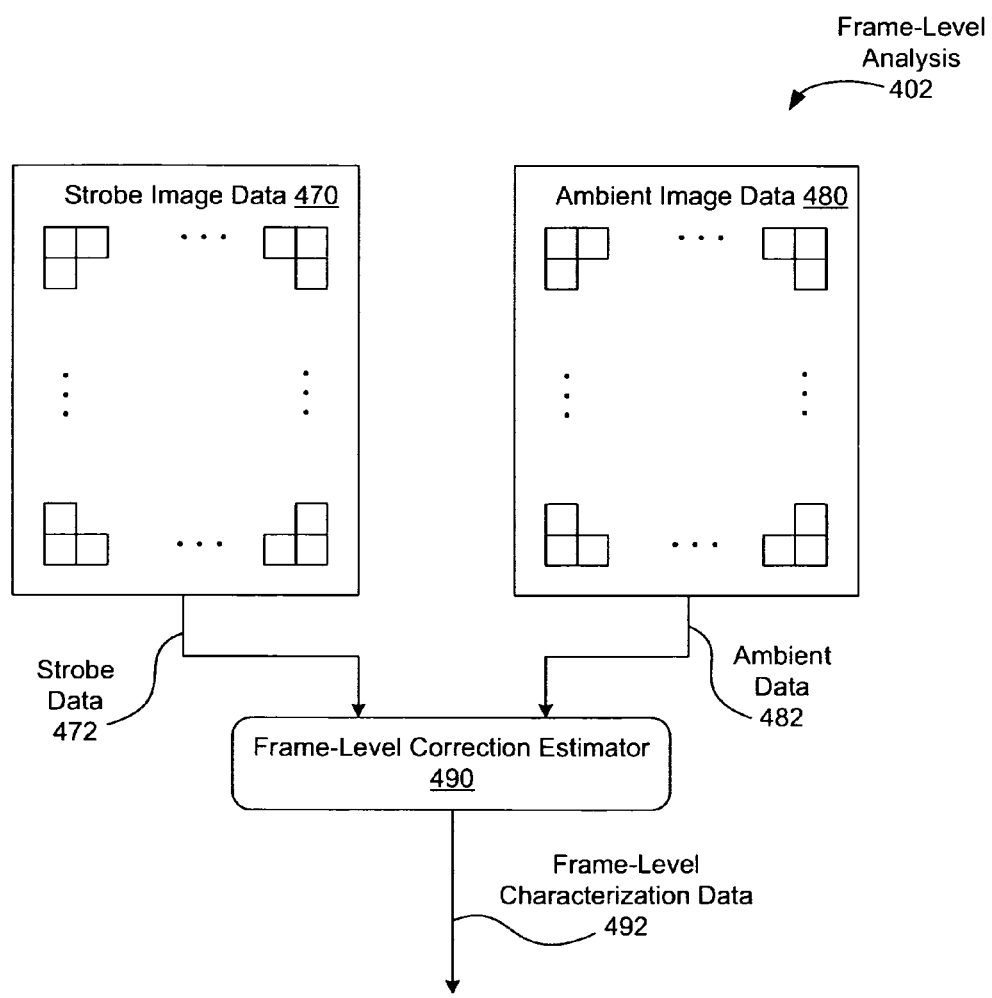
FIG. 4B illustrates a frame-level analysis process for generating frame-level characterization data, according to one embodiment of the present invention.
Figure 5A:
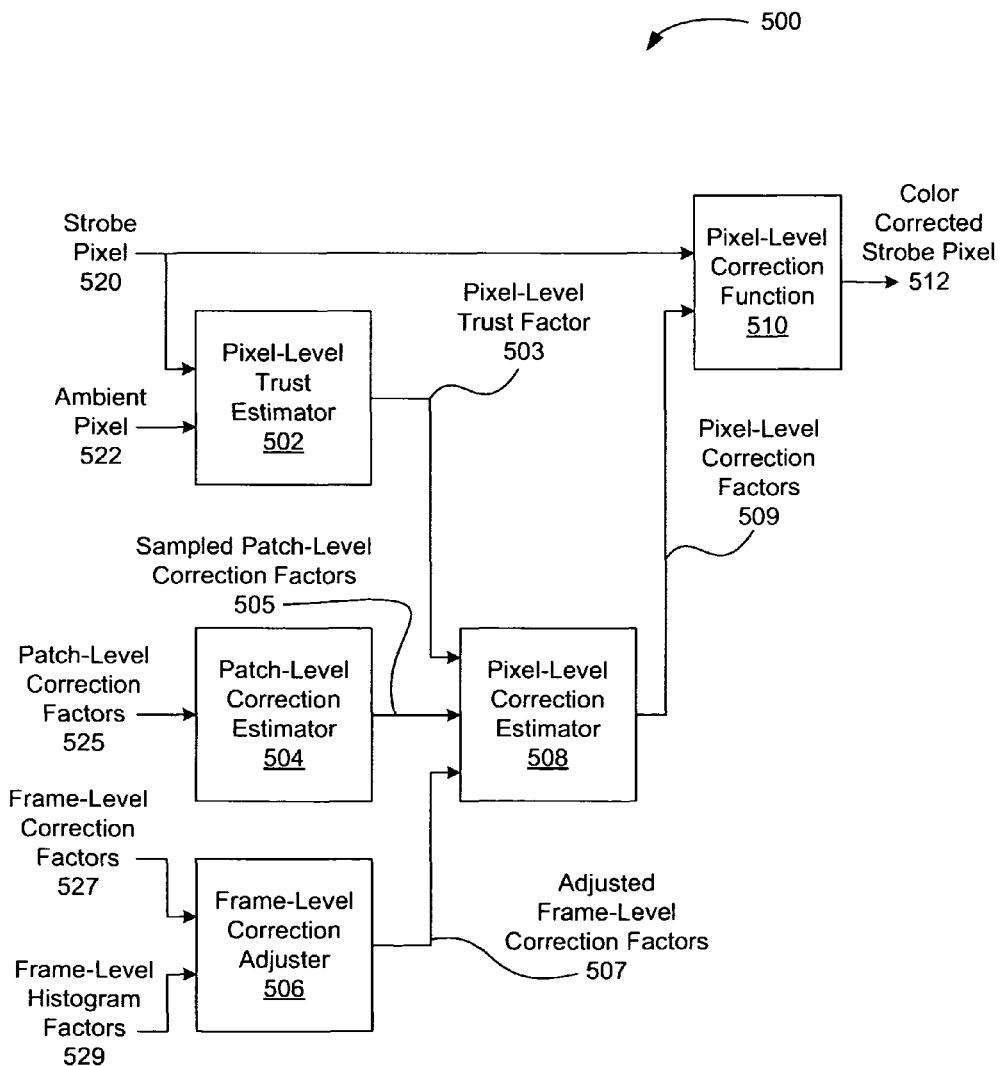
FIG. 5A illustrates a data flow process for correcting strobe pixel color, according to one embodiment of the present invention.
Figure 5B:
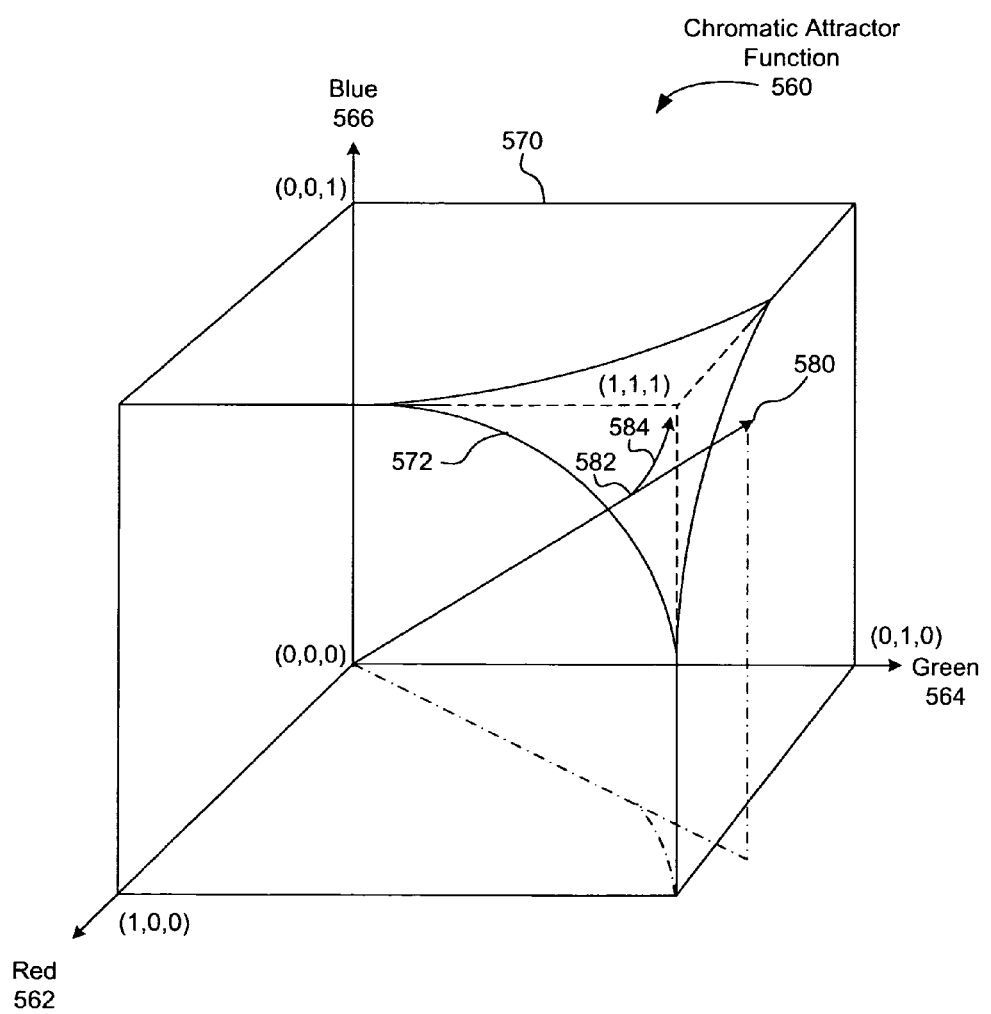
FIG. 5B illustrates a chromatic attractor function, according to one embodiment of the present invention.

As discussed previously in FIGS. 2B and 2D, strobe image 210 may need to be processed to correct color that is divergent from color in corresponding ambient image 220. Strobe image 210 may include frame-level divergence, spatially localized divergence, or a combination thereof. FIGS. 4A and 4B describe techniques implemented in frame analysis operation 240 for computing color correction data 242. In certain embodiments, color correction data 242 comprises frame-level characterization data for correcting overall color divergence, and patch-level correction data for correcting localized color divergence. FIGS. 5A and 5B discuss techniques for implementing color correction operation 250, based on color correction data 242.

FIG. 4A illustrates a patch-level analysis process 400 for generating a patch correction array 450, according to one embodiment of the present invention. Patch-level analysis provides local color correction information for correcting a region of a source strobe image to be consistent in overall color balance with an associated region of a source ambient image. A patch corresponds to a region of one or more pixels within an associated source image. A strobe patch 412 comprises representative color information for a region of one or more pixels within strobe patch array 410, and an associated ambient patch 422 comprises representative color information for a region of one or more pixels at a corresponding location within ambient patch array 420.

In one embodiment, strobe patch array 410 and ambient patch array 420 are processed on a per patch basis by patch-level correction estimator 430 to generate patch correction array 450. Strobe patch array 410 and ambient patch array 420 each comprise a two-dimensional array of patches, each having the same horizontal patch resolution and the same vertical patch resolution. In alternative embodiments, strobe patch array 410 and ambient patch array 420 may each have an arbitrary resolution and each may be sampled according to a horizontal and vertical resolution for patch correction array 450.

In one embodiment, patch data associated with strobe patch array 410 and ambient patch array 420 may be pre-computed and stored for substantially entire corresponding source images. Alternatively, patch data associated with strobe patch array 410 and ambient patch array 420 may be computed as needed, without allocating buffer space for strobe patch array 410 or ambient patch array 420.

In data flow process 202 of FIG. 2B, the source strobe image comprises strobe image 210, while in data flow process 206 of FIG. 2D, the source strobe image comprises aligned strobe image 232. Similarly, ambient patch array 420 comprises a set of patches generated from a source ambient image. In data flow process 202, the source ambient image comprises ambient image 220, while in data flow process 206, the source ambient image comprises aligned ambient image 234.

In one embodiment, representative color information for each patch within strobe patch array 410 is generated by averaging color for a four-by-four region of pixels from the source strobe image at a corresponding location, and representative color information for each patch within ambient patch array 420 is generated by averaging color for a four-by-four region of pixels from the ambient source image at a corresponding location. An average color may comprise red, green and blue components. Each four-by-four region may be non-overlapping or overlapping with respect to other four-by-four regions. In other embodiments, arbitrary regions may be implemented. Patch-level correction estimator 430 generates patch correction 432 from strobe patch 412 and a corresponding ambient patch 422. In certain embodiments, patch correction 432 is saved to patch correction array 450 at a corresponding location. In one embodiment, patch correction 432 includes correction factors for red, green, and blue, computed according to the pseudo-code of Table 2, below.

TABLE 2

```
ratio.r = (ambient.r) / (strobe.r);
ratio.g = (ambient.g) / (strobe.g);
ratio.b = (ambient.b) / (strobe.b);
maxRatio = max(ratio.r, max(ratio.g, ratio.b));
correct.r = (ratio.r / maxRatio);
correct.g = (ratio.g / maxRatio);
correct.b = (ratio.b / maxRatio);
```

Here, "strobe.r" refers to a red component for strobe patch 412, "strobe.g" refers to a green component for strobe patch 412, and "strobe.b" refers to a blue component for strobe patch 412. Similarly, "ambient.r," "ambient.g," and "ambient.b" refer respectively to red, green, and blue components of ambient patch 422. A maximum ratio of ambient to strobe components is computed as "maxRatio," which is then used to generate correction factors, including "correct.r" for a red channel, "correct.g" for a green channel, and "correct.b" for a blue channel. Correction factors correct.r, correct.g, and correct.b together comprise patch correction 432. These correction factors, when applied fully in color correction operation 250, cause pixels associated with strobe patch 412 to be corrected to reflect a color balance that is generally consistent with ambient patch 422.

In one alternative embodiment, each patch correction 432 comprises a slope and an offset factor for each one of at least red, green, and blue components. Here, components of source ambient image pixels bounded by a patch are treated as function input values and corresponding components of source strobe image pixels are treated as function outputs for a curve fitting procedure that estimates slope and offset parameters for the function. For example, red components of source ambient image pixels associated with a given patch may be treated as "X" values and corresponding red pixel components of source strobe image pixels may be treated as "Y" values, to form (X,Y) points that may be processed according to a least-squares linear fit procedure, thereby generating a slope parameter and an offset parameter for the red component of the patch. Slope and offset parameters for green and blue components may be computed similarly. Slope and offset parameters for a component describe a line equation for the component. Each patch correction 432 includes slope and offset parameters for at least red, green, and blue components. Conceptually, pixels within an associated strobe patch may be color corrected by evaluating line equations for red, green, and blue components.

In a different alternative embodiment, each patch correction 432 comprises three parameters describing a quadratic function for each one of at least red, green, and blue components. Here, components of source strobe image pixels bounded by a patch are fit against corresponding components of source ambient image pixels to generate quadratic parameters for color correction. Conceptually, pixels within an associated strobe patch may be color corrected by evaluating quadratic equations for red, green, and blue components.

FIG. 4B illustrates a frame-level analysis process 402 for generating frame-level characterization data 492, according to one embodiment of the present invention. Frame-level correction estimator 490 reads strobe data 472 comprising pixels from strobe image data 470 and ambient data 482 comprising pixels from ambient image data 480 to generate frame-level characterization data 492.

In certain embodiments, strobe data 472 comprises pixels from strobe image 210 of FIG. 2A and ambient data 482 comprises pixels from ambient image 220. In other embodiments, strobe data 472 comprises pixels from aligned strobe image 232 of FIG. 2C, and ambient data 482 comprises pixels from aligned ambient image 234. In yet other embodiments, strobe data 472 comprises patches representing average color from strobe patch array 410, and ambient data 482 comprises patches representing average color from ambient patch array 420.

In one embodiment, frame-level characterization data 492 includes at least frame-level color correction factors for red correction, green correction, and blue correction. Frame-level color correction factors may be computed according to the pseudo-code of Table 3.

TABLE 3

```
ratioSum.r = (ambientSum.r) / (strobeSum.r);
ratioSum.g = (ambientSum.g) / (strobeSum.g);
ratioSum.b = (ambientSum.b) / (strobeSum.b);
maxSumRatio = max(ratioSum.r, max(ratioSum.g, ratioSum.b));
correctFrame.r = (ratioSum.r / maxSumRatio);
correctFrame.g = (ratioSum.g / maxSumRatio);
correctFrame.b = (ratioSum.b / maxSumRatio);
```

Here, "strobeSum.r" refers to a sum of red components taken over strobe image data 470, "strobeSum.g" refers to a sum of green components taken over strobe image data 470, and "strobeSum.b" refers to a sum of blue components taken over strobe image data 470. Similarly, "ambientSum.r," "ambientSum.g," and "ambientSum.b" each refer to a sum of components taken over ambient image data 480 for respective red, green, and blue components. A maximum ratio of ambient to strobe sums is computed as "maxSumRatio," which is then used to generate frame-level color correction factors, including "correctFrame.r" for a red channel, "correctFrame.g" for a green channel, and "correctFrame.b" for a blue channel. These frame-level color correction factors, when applied fully and exclusively in color correction operation 250, cause overall color balance of strobe image 210 to be corrected to reflect a color balance that is generally consistent with that of ambient image 220.

While overall color balance for strobe image 210 may be corrected to reflect overall color balance of ambient image 220, a resulting color corrected rendering of strobe image 210 based only on frame-level color correction factors may not have a natural appearance and will likely include local regions with divergent color with respect to ambient image 220. Therefore, as described below in FIG. 5A, patch-level correction may be used in conjunction with frame-level correction to generate a color corrected strobe image.

In one embodiment, frame-level characterization data 492 also includes at least a histogram characterization of strobe image data 470 and a histogram characterization of ambient image data 480. Histogram characterization may include identifying a low threshold intensity associated with a certain low percentile of pixels, a median threshold intensity associated with a fiftieth percentile of pixels, and a high threshold intensity associated with a high threshold percentile of pixels. In one embodiment, the low threshold intensity is associated with an approximately fifteenth percentile of pixels and a high threshold intensity is associated with an approximately eighty-fifth percentile of pixels, so that approximately fifteen percent of pixels within an associated image have a lower intensity than a calculated low threshold intensity and approximately eighty-five percent of pixels have a lower intensity than a calculated high threshold intensity.

In certain embodiments, frame-level characterization data 492 also includes at least a heat-map, described previously. The heat-map may be computed using individual pixels or patches representing regions of pixels. In one embodiment, the heat-map is normalized using a logarithm operator, configured to normalize a particular heat-map location against a logarithm of a total number of points contributing to the heat-map. Alternatively, frame-level characterization data 492 includes a factor that summarizes at least one characteristic of the heat-map, such as a diagonal clustering factor to quantify clustering along diagonal 351 of FIGS. 3C and 3D. This diagonal clustering factor may be used to dynamically configure a given blend surface.

While frame-level and patch-level correction coefficients have been discussed representing two different spatial extents, persons skilled in the art will recognize that more than two levels of spatial extent may be implemented without departing the scope and spirit of the present invention.

FIG. 5A illustrates a data flow process 500 for correcting strobe pixel color, according to one embodiment of the present invention. A strobe pixel 520 is processed to generate a color corrected strobe pixel 512. In one embodiment, strobe pixel 520 comprises a pixel associated with strobe image 210 of FIG. 2B, ambient pixel 522 comprises a pixel associated with ambient image 220, and color corrected strobe pixel 512 comprises a pixel associated with corrected strobe image data 252. In an alternative embodiment, strobe pixel 520 comprises a pixel associated with aligned strobe image 232 of FIG. 2D, ambient pixel 522 comprises a pixel associated with aligned ambient image 234, and color corrected strobe pixel 512 comprises a pixel associated with corrected strobe image data 252. Color corrected strobe pixel 512 may correspond to strobe pixel 312 in FIG. 3A, and serve as an input to blend function 330.

In one embodiment, patch-level correction factors 525 comprise one or more sets of correction factors for red, green, and blue associated with patch correction 432 of FIG. 4A, frame-level correction factors 527 comprise frame-level correction factors for red, green, and blue associated with frame-level characterization data 492 of FIG. 4B, and frame-level histogram factors 529 comprise at least a low threshold intensity and a median threshold intensity for both an ambient histogram and a strobe histogram associated with frame-level characterization data 492.

A pixel-level trust estimator 502 computes a pixel-level trust factor 503 from strobe pixel 520 and ambient pixel 522. In one embodiment, pixel-level trust factor 503 is computed according to the pseudo-code of Table 4, where strobe pixel 520 corresponds to strobePixel, ambient pixel 522 corresponds to ambientPixel, and pixel-level trust factor 503 corresponds to pixelTrust. Here, ambientPixel and strobePixel may comprise a vector variable, such as a well known vec3 or vec4 vector variable.

TABLE 4 ambientIntensity = intensity (ambientPixel);
strobeIntensity = intensity (strobePixel);
stepInput = ambientIntensity * strobeIntensity;
pixelTrust = smoothstep (lowEdge, highEdge, stepInput);

Here, an intensity function may implement Equation 1 to compute ambientIntensity and strobeIntensity, corresponding respectively to an intensity value for ambientPixel and an intensity value for strobePixel. While the same intensity function is shown computing both ambientIntensity and strobeIntensity, certain embodiments may compute each intensity value using a different intensity function. A product operator may be used to compute stepinput, based on ambientIntensity and strobeIntensity. The well-known smoothstep function implements a relatively smoothly transition from 0.0 to 1.0 as stepinput passes through lowEdge and then through highEdge. In one embodiment, lowEge=0.25 and highEdge=0.66.

A patch-level correction estimator 504 computes patch-level correction factors 505 by sampling patch-level correction factors 525. In one embodiment, patch-level correction estimator 504 implements bilinear sampling over four sets of patch-level color correction samples to generate sampled patch-level correction factors 505. In an alternative embodiment, patch-level correction estimator 504 implements distance weighted sampling over four or more sets of patch-level color correction samples to generate sampled patch-level correction factors 505. In another alternative embodiment, a set of sampled patch-level correction factors 505 is computed using pixels within a region centered about strobe pixel 520. Persons skilled in the art will recognize that any technically feasible technique for sampling one or more patch-level correction factors to generate sampled patch-level correction factors 505 is within the scope and spirit of the present invention.

In one embodiment, each one of patch-level correction factors 525 comprises a red, green, and blue color channel correction factor. In a different embodiment, each one of the patch-level correction factors 525 comprises a set of line equation parameters for red, green, and blue color channels. Each set of line equation parameters may include a slope and an offset. In another embodiment, each one of the patch-level correction factors 525 comprises a set of quadratic curve parameters for red, green, and blue color channels. Each set of quadratic curve parameters may include a square term coefficient, a linear term coefficient, and a constant.

In one embodiment, frame-level correction adjuster 506 computes adjusted frame-level correction factors 507 (adjCorrectFrame) from the frame-level correction factors for red, green, and blue according to the pseudo-code of Table 5. Here, a mix operator may function according to Equation 2, where variable A corresponds to 1.0, variable B corresponds to a correctFrame color value, and frameTrust may be computed according to an embodiment described below in conjunction with the pseudo-code of Table 6. As discussed previously, correctFrame comprises frame-level correction factors. Parameter frameTrust quantifies how trustworthy a particular pair of ambient image and strobe image may be for performing frame-level color correction.

TABLE 5 adjCorrectFrame.r = mix(1.0, correctFrame.r, frameTrust);
adjCorrectFrame.g = mix(1.0, correctFrame.g, frameTrust);
adjCorrectFrame.b = mix(1.0, correctFrame.b, frameTrust);

When frameTrust approaches zero (correction factors not trustworthy), the adjusted frame-level correction factors 507 converge to 1.0, which yields no frame-level color correction. When frameTrust is 1.0 (completely trustworthy), the adjusted frame-level correction factors 507 converge to values calculated previously in Table 3. The pseudo-code of Table 6 illustrates one technique for calculating frameTrust.

TABLE 6 strobeExp = (WSL*SL + WSM*SM + WSH*SH) / (WSL + WSM + WSH);
ambientExp = (WAL*SL + WAM*SM + WAH*SH) / (WAL + WAM + WAH);
frameTrustStrobe = smoothstep (SLE, SHE, strobeExp);
frameTrustAmbient = smoothstep (ALE, AHE, ambientExp);
frameTrust = frameTrustStrobe * frameTrustAmbient;

Here, strobe exposure (strobeExp) and ambient exposure (ambientExp) are each characterized as a weighted sum of corresponding low threshold intensity, median threshold intensity, and high threshold intensity values. Constants WSL, WSM, and WSH correspond to strobe histogram contribution weights for low threshold intensity, median threshold intensity, and high threshold intensity values, respectively. Variables SL, SM, and SH correspond to strobe histogram low threshold intensity, median threshold intensity, and high threshold intensity values, respectively. Similarly, constants WAL, WAM, and WAH correspond to ambient histogram contribution weights for low threshold intensity, median threshold intensity, and high threshold intensity values, respectively; and variables AL, AM, and AH correspond to ambient histogram low threshold intensity, median threshold intensity, and high threshold intensity values, respectively. A strobe frame-level trust value (frameTrustStrobe) is computed for a strobe frame associated with strobe pixel 520 to reflect how trustworthy the strobe frame is for the purpose of frame-level color correction. In one embodiment, WSL=WAL=1.0, WSM=WAM=2.0, and WSH=WAH=0.0. In other embodiments, different weights may be applied, for example, to customize the techniques taught herein to a particular camera apparatus. In certain embodiments, other percentile thresholds may be measured, and different combinations of weighted sums may be used to compute frame-level trust values.

In one embodiment, a smoothstep function with a strobe low edge (SLE) and strobe high edge (SHE) is evaluated based on strobeExp. Similarly, a smoothstep function with ambient low edge (ALE) and ambient high edge (AHE) is evaluated to compute an ambient frame-level trust value (frameTrustAmbient) for an ambient frame associated with ambient pixel 522 to reflect how trustworthy the ambient frame is for the purpose of frame-level color correction. In one embodiment, SLE=ALE=0.15, and SHE=AHE=0.30. In other embodiments, different low and high edge values may be used.

In one embodiment, a frame-level trust value (frameTrust) for frame-level color correction is computed as the product of frameTrustStrobe and frameTrustAmbient. When both the strobe frame and the ambient frame are sufficiently exposed and therefore trustworthy frame-level color references, as indicated by frameTrustStrobe and frameTrustAmbient, the product of frameTrustStrobe and frameTrustAmbient will reflect a high trust for frame-level color correction. If either the strobe frame or the ambient frame is inadequately exposed to be a trustworthy color reference, then a color correction based on a combination of strobe frame and ambient frame should not be trustworthy, as reflected by a low or zero value for frameTrust.

In an alternative embodiment, the frame-level trust value (frameTrust) is generated according to direct user input, such as via a UI color adjustment tool having a range of control positions that map to a frameTrust value. The UI color adjustment tool may generate a full range of frame-level trust values (0.0 to 1.0) or may generate a value constrained to a computed range. In certain settings, the mapping may be non-linear to provide a more natural user experience. In one embodiment, the control position also influences pixel-level trust factor 503 (pixelTrust), such as via a direct bias or a blended bias.

A pixel-level correction estimator 508 is configured to generate pixel-level correction factors 509 (pixCorrection) from sampled patch-level correction factors 505 (correct), adjusted frame-level correction factors 507, and pixel-level trust factor 503. In one embodiment, pixel-level correction estimator 508 comprises a mix function, whereby sampled patch-level correction factors 505 is given substantially full mix weight when pixel-level trust factor 503 is equal to 1.0 and adjusted frame-level correction factors 507 is given substantially full mix weight when pixel-level trust factor 503 is equal to 0.0. Pixel-level correction estimator 508 may be implemented according to the pseudo-code of Table 7.

TABLE 7 pixCorrection.r = mix(adjCorrectFrame.r, correct.r, pixelTrust);
pixCorrection.g = mix(adjCorrectFrame.g, correct.g, pixelTrust);
pixCorrection.b = mix(adjCorrectFrame.b, correct.b, pixelTrust);

In another embodiment, line equation parameters comprising slope and offset define sampled patch-level correction factors 505 and adjusted frame-level correction factors 507. These line equation parameters are mixed within pixel-level correction estimator 508 according to pixelTrust to yield pixel-level correction factors 509 comprising line equation parameters for red, green, and blue channels. In yet another embodiment, quadratic parameters define sampled patch-level correction factors 505 and adjusted frame-level correction factors 507. In one embodiment, the quadratic parameters are mixed within pixel-level correction estimator 508 according to pixelTrust to yield pixel-level correction factors 509 comprising quadratic parameters for red, green, and blue channels. In another embodiment, quadratic equations are evaluated separately for frame-level correction factors and patch level correction factors for each color channel, and the results of evaluating the quadratic equations are mixed according to pixelTrust.

In certain embodiments, pixelTrust is at least partially computed by image capture information, such as exposure time or exposure ISO index. For example, if an image was captured with a very long exposure at a very high ISO index, then the image may include significant chromatic noise and may not represent a good frame-level color reference for color correction.

Pixel-level correction function 510 generates color corrected strobe pixel 512 from strobe pixel 520 and pixel-level correction factors 509. In one embodiment, pixel-level correction factors 509 comprise correction factors pixCorrection.r, pixCorrection.g, and pixCorrection.b and color corrected strobe pixel 512 is computed according to the pseudo-code of Table 8.

TABLE 8

```
// scale red, green, blue
vec3 pixCorrection = (pixCorrection.r, pixCorrection.g, pixCorrection.b);
vec3 deNormCorrectedPixel = strobePixel * pixCorrection;
normalizeFactor = length(strobePixel) / length(deNormCorrectedPixel);
vec3 normCorrectedPixel = deNormCorrectedPixel * normalizeFactor;
vec3 correctedPixel = cAttractor(normCorrectedPixel);
```

Here, pixCorrection comprises a vector of three components (vec3) corresponding pixel-level correction factors pixCorrection.r, pixCorrection.g, and pixCorrection.b. A de-normalized, color corrected pixel is computed as deNormCorrectedPixel. A pixel comprising a red, green, and blue component defines a color vector in a three-dimensional space, the color vector having a particular length. The length of a color vector defined by deNormCorrectedPixel may be different with respect to a color vector defined by strobePixel. Altering the length of a color vector changes the intensity of a corresponding pixel. To maintain proper intensity for color corrected strobe pixel 512, deNormCorrectedPixel is re-normalized via normalizeFactor, which is computed as a ratio of length for a color vector defined by strobePixel to a length for a color vector defined by deNormCorrectedPixel. Color vector normCorrectedPixel includes pixel-level color correction and re-normalization to maintain proper pixel intensity. A length function may be performed using any technically feasible technique, such as calculating a square root of a sum of squares for individual vector component lengths.

A chromatic attractor function (cAttractor) gradually converges an input color vector to a target color vector as the input color vector increases in length. Below a threshold length, the chromatic attractor function returns the input color vector. Above the threshold length, the chromatic attractor function returns an output color vector that is increasingly convergent on the target color vector. The chromatic attractor function is described in greater detail below in FIG. 5B.

In alternative embodiments, pixel-level correction factors comprise a set of line equation parameters per color channel, with color components of strobePixel comprising function inputs for each line equation. In such embodiments, pixel-level correction function 510 evaluates the line equation parameters to generate color corrected strobe pixel 512. This evaluation process is illustrated in the pseudo-code of Table 9.

TABLE 9

```
// evaluate line equation based on strobePixel for red, green, blue
vec3 pixSlope = (pixSlope.r, pixSlope.g, pixSlope.b);
vec3 pixOffset = (pixOffset.r, pixOffset.g, pixOffset.b);
vec3 deNormCorrectedPixel = (strobePixel * pixSlope) + pixOffset;
normalizeFactor = length(strobePixel) / length(deNormCorrectedPixel);
vec3 normCorrectedPixel = deNormCorrectedPixel * normalizeFactor;
vec3 correctedPixel = cAttractor(normCorrectedPixel);
```

In other embodiments, pixel level correction factors comprise a set of quadratic parameters per color channel, with color components of strobePixel comprising function inputs for each quadratic equation. In such embodiments, pixel-level correction function 510 evaluates the quadratic equation parameters to generate color corrected strobe pixel 512.

In certain embodiments chromatic attractor function (cAttractor) implements a target color vector of white (1, 1, 1), and causes very bright pixels to converge to white, providing a natural appearance to bright portions of an image. In other embodiments, a target color vector is computed based on spatial color information, such as an average color for a region of pixels surrounding the strobe pixel. In still other embodiments, a target color vector is computed based on an average frame-level color. A threshold length associated with the chromatic attractor function may be defined as a constant, or, without limitation, by a user input, a characteristic of a strobe image or an ambient image or a combination thereof. In an alternative embodiment, pixel-level correction function 510 does not implement the chromatic attractor function.

In one embodiment, a trust level is computed for each patch-level correction and applied to generate an adjusted patch-level correction factor comprising sampled patch-level correction factors 505. Generating the adjusted patch-level correction may be performed according to the techniques taught herein for generating adjusted frame-level correction factors 507.

Other embodiments include two or more levels of spatial color correction for a strobe image based on an ambient image, where each level of spatial color correction may contribute a non-zero weight to a color corrected strobe image comprising one or more color corrected strobe pixels. Such embodiments may include patches of varying size comprising varying shapes of pixel regions without departing the scope of the present invention.

FIG. 5B illustrates a chromatic attractor function 560, according to one embodiment of the present invention. A color vector space is shown having a red axis 562, a green axis 564, and a blue axis 566. A unit cube 570 is bounded by an origin at coordinate (0, 0, 0) and an opposite corner at coordinate (1, 1, 1). A surface 572 having a threshold distance from the origin is defined within the unit cube. Color vectors having a length that is shorter than the threshold distance are conserved by the chromatic attractor function 560. Color vectors having a length that is longer than the threshold distance are converged towards a target color. For example, an input color vector 580 is defined along a particular path that describes the color of the input color vector 580, and a length that describes the intensity of the color vector. The distance from the origin to point 582 along input color vector 580 is equal to the threshold distance. In this example, the target color is pure white (1, 1, 1), therefore any additional length associated with input color vector 580 beyond point 582 follows path 584 towards the target color of pure white.

One implementation of chromatic attractor function 560, comprising the cAttractor function of Tables 8 and 9 is illustrated in the pseudo-code of Table 10.

TABLE 10

```
extraLength = max(length (inputColor), distMin) ;
mixValue= (extraLength − distMin) / (distMax− distMin);
outputColor = mix (inputColor, targetColor, mixValue);
```

Here, a length value associated with inputColor is compared to distMin, which represents the threshold distance. If the length value is less than distMin, then the "max" operator returns distMin. The mixValue term calculates a parameterization from 0.0 to 1.0 that corresponds to a length value ranging from the threshold distance to a maximum possible length for the color vector, given by the square root of 3.0. If extraLength is equal to distMin, then mixValue is set equal to 0.0 and outputColor is set equal to the inputColor by the mix operator. Otherwise, if the length value is greater than distMin, then mixValue represents the parameterization, enabling the mix operator to appropriately converge inputColor to targetColor as the length of inputColor approaches the square root of 3.0. In one embodiment, distMax is equal to the square root of 3.0 and distMin=1.45. In other embodiments different values may be used for distMax and distMin. For example, if distMin=1.0, then chromatic attractor 560 begins to converge to targetColor much sooner, and at lower intensities. If distMax is set to a larger number, then an inputPixel may only partially converge on targetColor, even when inputPixel has a very high intensity. Either of these two effects may be beneficial in certain applications.

While the pseudo-code of Table 10 specifies a length function, in other embodiments, computations may be performed in length-squared space using constant squared values with comparable results.

In one embodiment, targetColor is equal to (1,1,1), which represents pure white and is an appropriate color to "burn" to in overexposed regions of an image rather than a color dictated solely by color correction. In another embodiment, targetColor is set to a scene average color, which may be arbitrary. In yet another embodiment, targetColor is set to a color determined to be the color of an illumination source within a given scene.

Figure 6:
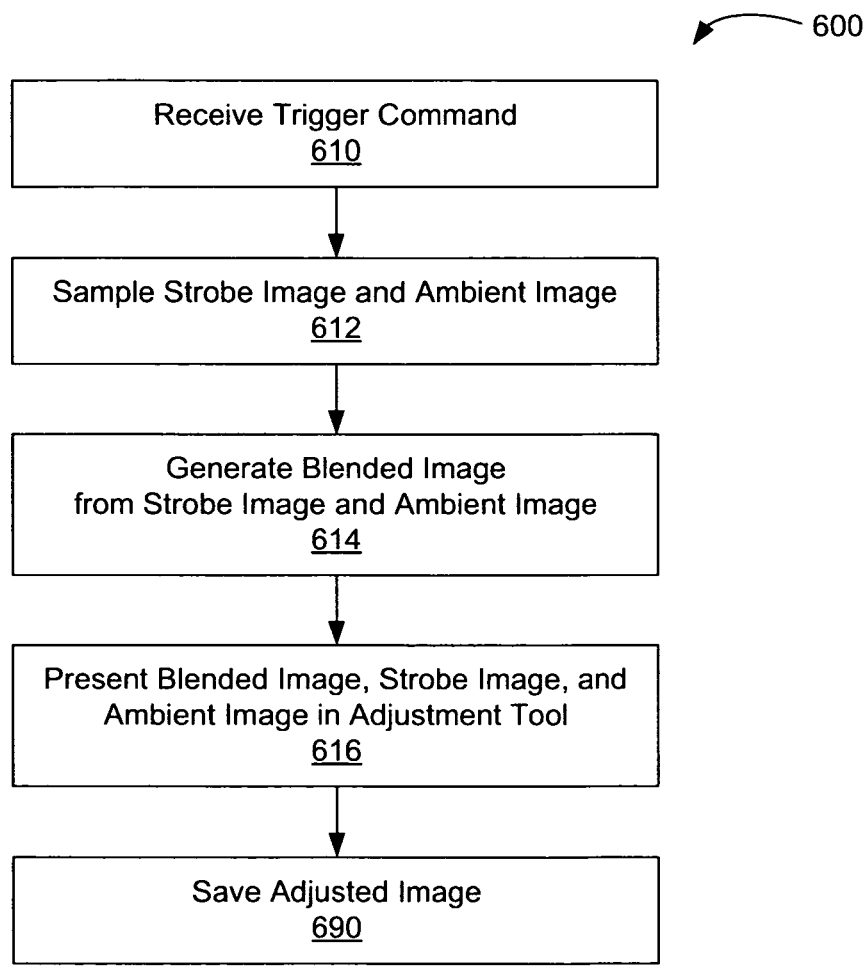
FIG. 6 is a flow diagram of method steps for generating an adjusted digital photograph, according to one embodiment of the present invention.

FIG. 6 is a flow diagram of method 600 for generating an adjusted digital photograph, according to one embodiment of the present invention. Although the method steps are described in conjunction with the systems of FIGS. 1A-1D, persons skilled in the art will understand that any system configured to perform the method steps, in any order, is within the scope of the present invention.

Method 600 begins in step 610, where a digital photographic system, such as digital photographic system 100 of FIG. 1A, receives a trigger command to take a digital photograph. The trigger command may comprise a user input event, such as a button press, remote control command related to a button press, completion of a timer count down, an audio indication, or any other technically feasible user input event. In one embodiment, the digital photographic system implements digital camera 102 of FIG. 1C, and the trigger command is generated when shutter release button 115 is pressed. In another embodiment, the digital photographic system implements mobile device 104 of FIG. 1D, and the trigger command is generated when a UI button is pressed.

In step 612, the digital photographic system samples a strobe image and an ambient image. In one embodiment, the strobe image is taken before the ambient image. Alternatively, the ambient image is taken before the strobe image. In certain embodiments, a white balance operation is performed on the ambient image. Independently, a white balance operation may be performed on the strobe image. In other embodiments, such as in scenarios involving raw digital photographs, no white balance operation is applied to either the ambient image or the strobe image.

In step 614, the digital photographic system generates a blended image from the strobe image and the ambient image. In one embodiment, the digital photographic system generates the blended image according to data flow process 200 of FIG. 2A. In a second embodiment, the digital photographic system generates the blended image according to data flow process 202 of FIG. 2B. In a third embodiment, the digital photographic system generates the blended image according to data flow process 204 of FIG. 2C. In a fourth embodiment, the digital photographic system generates the blended image according to data flow process 206 of FIG. 2D. In each of these embodiments, the strobe image comprises strobe image 210, the ambient image comprises ambient image 220, and the blended image comprises blended image 280.

In step 616, the digital photographic system presents an adjustment tool configured to present at least the blended image, the strobe image, and the ambient image, according to a transparency blend among two or more of the images. The transparency blend may be controlled by a user interface slider. The adjustment tool may be configured to save a particular blend state of the images as an adjusted image. The adjustment tool is described in greater detail below in FIGS. 9 and 10.

The method terminates in step 690, where the digital photographic system saves at least the adjusted image.

Figure 7A:
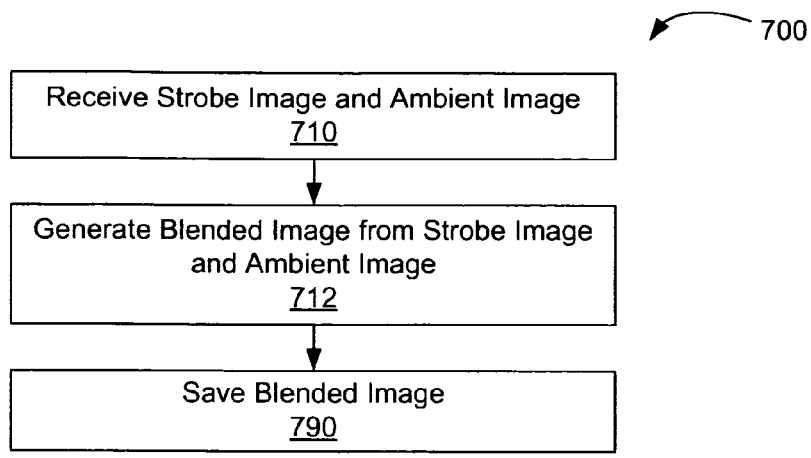
FIG. 7A is a flow diagram of method steps for blending a strobe image with an ambient image to generate a blended image, according to a first embodiment of the present invention.

FIG. 7A is a flow diagram of method 700 for blending a strobe image with an ambient image to generate a blended image, according to a first embodiment of the present invention. Although the method steps are described in conjunction with the systems of FIGS. 1A-1D, persons skilled in the art will understand that any system configured to perform the method steps, in any order, is within the scope of the present invention. In one embodiment, method 700 implements data flow 200 of FIG. 2A. The strobe image and the ambient image each comprise at least one pixel and may each comprise an equal number of pixels.

The method begins in step 710, where a processor complex within a digital photographic system, such as processor complex 110 within digital photographic system 100 of FIG. 1A, receives a strobe image and an ambient image, such as strobe image 210 and ambient image 220, respectively. In step 712, the processor complex generates a blended image, such as blended image 280, by executing a blend operation 270 on the strobe image and the ambient image. The method terminates in step 790, where the processor complex saves the blended image, for example to NV memory 116, volatile memory 118, or memory system 162.

Figure 7B:
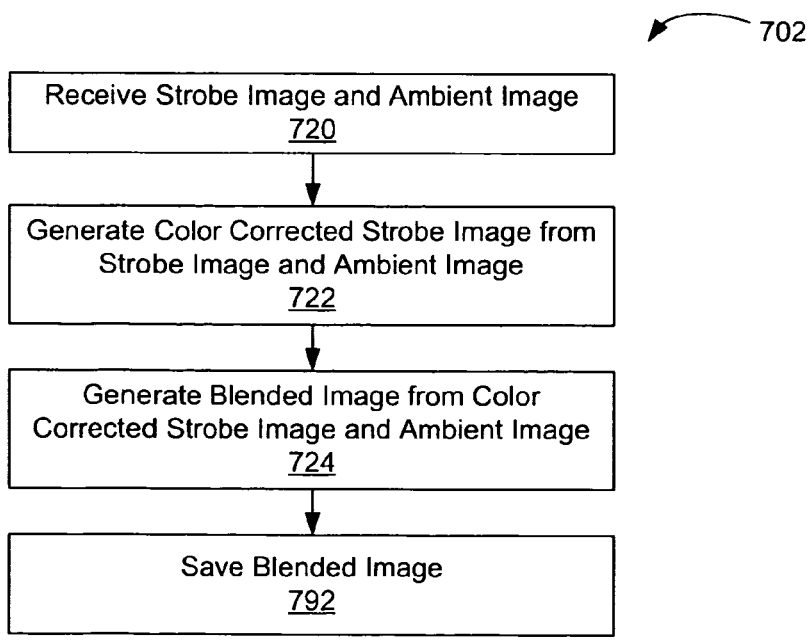
FIG. 7B is a flow diagram of method steps for blending a strobe image with an ambient image to generate a blended image, according to a second embodiment of the present invention.

FIG. 7B is a flow diagram of method 702 for blending a strobe image with an ambient image to generate a blended image, according to a second embodiment of the present invention. Although the method steps are described in conjunction with the systems of FIGS. 1A-1D, persons skilled in the art will understand that any system configured to perform the method steps, in any order, is within the scope of the present invention. In one embodiment, method 702 implements data flow 202 of FIG. 2B. The strobe image and the ambient image each comprise at least one pixel and may each comprise an equal number of pixels.

The method begins in step 720, where a processor complex within a digital photographic system, such as processor complex 110 within digital photographic system 100 of FIG. 1A, receives a strobe image and an ambient image, such as strobe image 210 and ambient image 220, respectively. In step 722, the processor complex generates a color corrected strobe image, such as corrected strobe image data 252, by executing a frame analysis operation 240 on the strobe image and the ambient image and executing and a color correction operation 250 on the strobe image. In step 724, the processor complex generates a blended image, such as blended image 280, by executing a blend operation 270 on the color corrected strobe image and the ambient image. The method terminates in step 792, where the processor complex saves the blended image, for example to NV memory 116, volatile memory 118, or memory system 162.

Figure 8A:
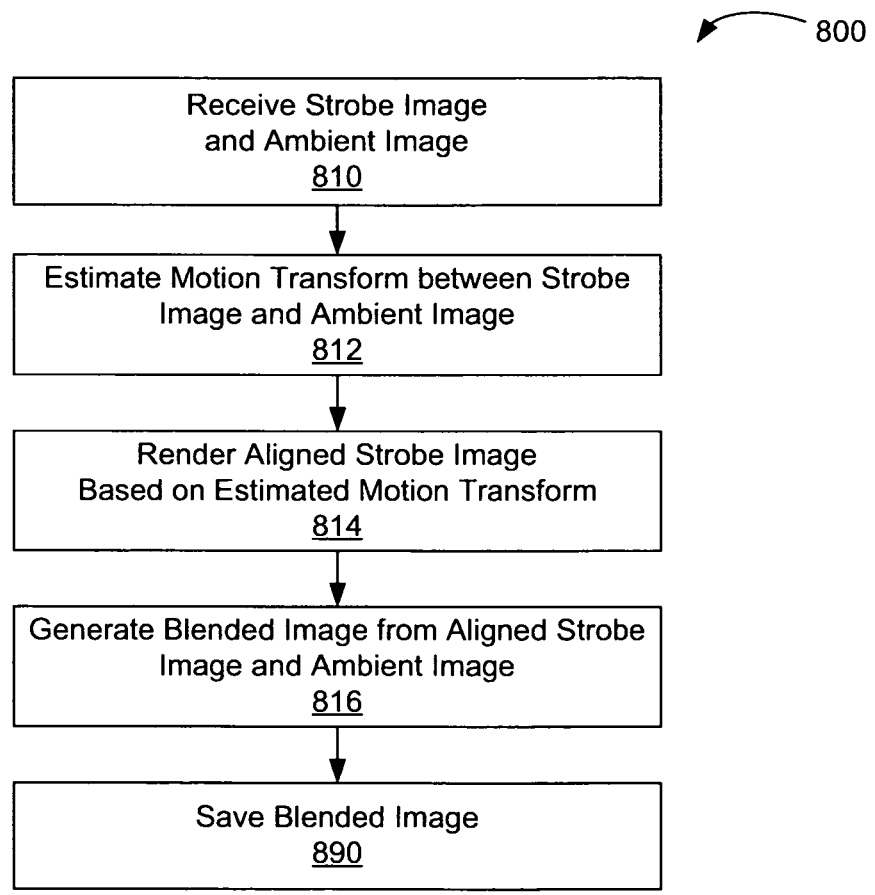
FIG. 8A is a flow diagram of method steps for blending a strobe image with an ambient image to generate a blended image, according to a third embodiment of the present invention.

FIG. 8A is a flow diagram of method 800 for blending a strobe image with an ambient image to generate a blended image, according to a third embodiment of the present invention. Although the method steps are described in conjunction with the systems of FIGS. 1A-1D, persons skilled in the art will understand that any system configured to perform the method steps, in any order, is within the scope of the present invention. In one embodiment, method 800 implements data flow 204 of FIG. 2C. The strobe image and the ambient image each comprise at least one pixel and may each comprise an equal number of pixels.

The method begins in step 810, where a processor complex within a digital photographic system, such as processor complex 110 within digital photographic system 100 of FIG. 1A, receives a strobe image and an ambient image, such as strobe image 210 and ambient image 220, respectively. In step 812, the processor complex estimates a motion transform between the strobe image and the ambient image. In step 814, the processor complex renders at least an aligned strobe image or an aligned ambient image based the estimated motion transform. In certain embodiments, the processor complex renders both the aligned strobe image and the aligned ambient image based on the motion transform. The aligned strobe image and the aligned ambient image may be rendered to the same resolution so that each is aligned to the other. In one embodiment, steps 812 and 814 together comprise alignment operation 230. In step 816, the processor complex generates a blended image, such as blended image 280, by executing a blend operation 270 on the aligned strobe image and the aligned ambient image. The method terminates in step 890, where the processor complex saves the blended image, for example to NV memory 116, volatile memory 118, or memory system 162.

Figure 8B:
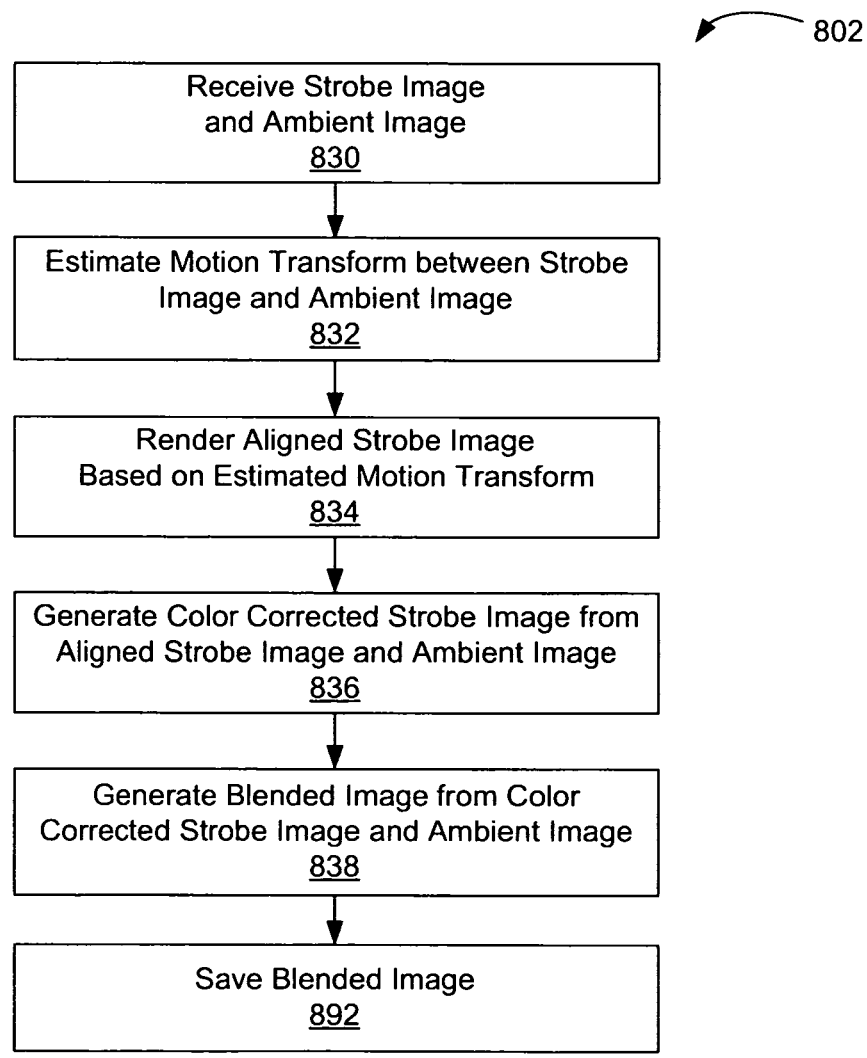
FIG. 8B is a flow diagram of method steps for blending a strobe image with an ambient image to generate a blended image, according to a fourth embodiment of the present invention.

FIG. 8B is a flow diagram of method steps for blending a strobe image with an ambient image to generate a blended image, according to a fourth embodiment of the present invention. Although the method steps are described in conjunction with the systems of FIGS. 1A-1D, persons skilled in the art will understand that any system configured to perform the method steps, in any order, is within the scope of the present invention. In one embodiment, method 802 implements data flow 206 of FIG. 2D. The strobe image and the ambient image each comprise at least one pixel and may each comprise an equal number of pixels.

The method begins in step 830, where a processor complex within a digital photographic system, such as processor complex 110 within digital photographic system 100 of FIG. 1A, receives a strobe image and an ambient image, such as strobe image 210 and ambient image 220, respectively. In step 832, the processor complex estimates a motion transform between the strobe image and the ambient image. In step 834, the processor complex may render at least an aligned strobe image or an aligned ambient image based the estimated motion transform. In certain embodiments, the processor complex renders both the aligned strobe image and the aligned ambient image based on the motion transform. The aligned strobe image and the aligned ambient image may be rendered to the same resolution so that each is aligned to the other. In one embodiment, steps 832 and 834 together comprise alignment operation 230.

In step 836, the processor complex generates a color corrected strobe image, such as corrected strobe image data 252, by executing a frame analysis operation 240 on the aligned strobe image and the aligned ambient image and executing a color correction operation 250 on the aligned strobe image. In step 838, the processor complex generates a blended image, such as blended image 280, by executing a blend operation 270 on the color corrected strobe image and the aligned ambient image. The method terminates in step 892, where the processor complex saves the blended image, for example to NV memory 116, volatile memory 118, or memory system 162.

While the techniques taught herein are discussed above in the context of generating a digital photograph having a natural appearance from an underlying strobe image and ambient image with potentially discordant color, these techniques may be applied in other usage models as well.

For example, when compositing individual images to form a panoramic image, color inconsistency between two adjacent images can create a visible seam, which detracts from overall image quality. Persons skilled in the art will recognize that frame analysis operation 240 may be used in conjunction with color correction operation 250 to generated panoramic images with color-consistent seams, which serve to improve overall image quality. In another example, frame analysis operation 240 may be used in conjunction with color correction operation 250 to improve color consistency within high dynamic range (HDR) images.

In yet another example, multispectral imaging may be improved by enabling the addition of a strobe illuminator, while maintaining spectral consistency. Multispectral imaging refers to imaging of multiple, arbitrary wavelength ranges, rather than just conventional red, green, and blue ranges. By applying the above techniques, a multispectral image may be generated by blending two or more multispectral images having different illumination sources.

In still other examples, the techniques taught herein may be applied in an apparatus that is separate from digital photographic system 100 of FIG. 1A. Here, digital photographic system 100 may be used to generate and store a strobe image and an ambient image. The strobe image and ambient image are then combined later within a computer system, disposed locally with a user, or remotely within a cloud-based computer system. In one embodiment, method 802 comprises a software module operable with an image processing tool to enable a user to read the strobe image and the ambient image previously stored, and to generate a blended image within a computer system that is distinct from digital photographic system 100.

Persons skilled in the art will recognize that while certain intermediate image data may be discussed in terms of a particular image or image data, these images serve as illustrative abstractions. Such buffers may be allocated in certain implementations, while in other implementations intermediate data is only stored as needed. For example, aligned strobe image 232 may be rendered to completion in an allocated image buffer during a certain processing step or steps, or alternatively, pixels associated with an abstraction of an aligned image may be rendered as needed without a need to allocate an image buffer to store aligned strobe image 232.

While the techniques described above discuss color correction operation 250 in conjunction with a strobe image that is being corrected to an ambient reference image, a strobe image may serve as a reference image for correcting an ambient image. In one embodiment ambient image 220 is subjected to color correction operation 250, and blend operation 270 operates as previously discussed for blending an ambient image and a strobe image.

Figure 9:
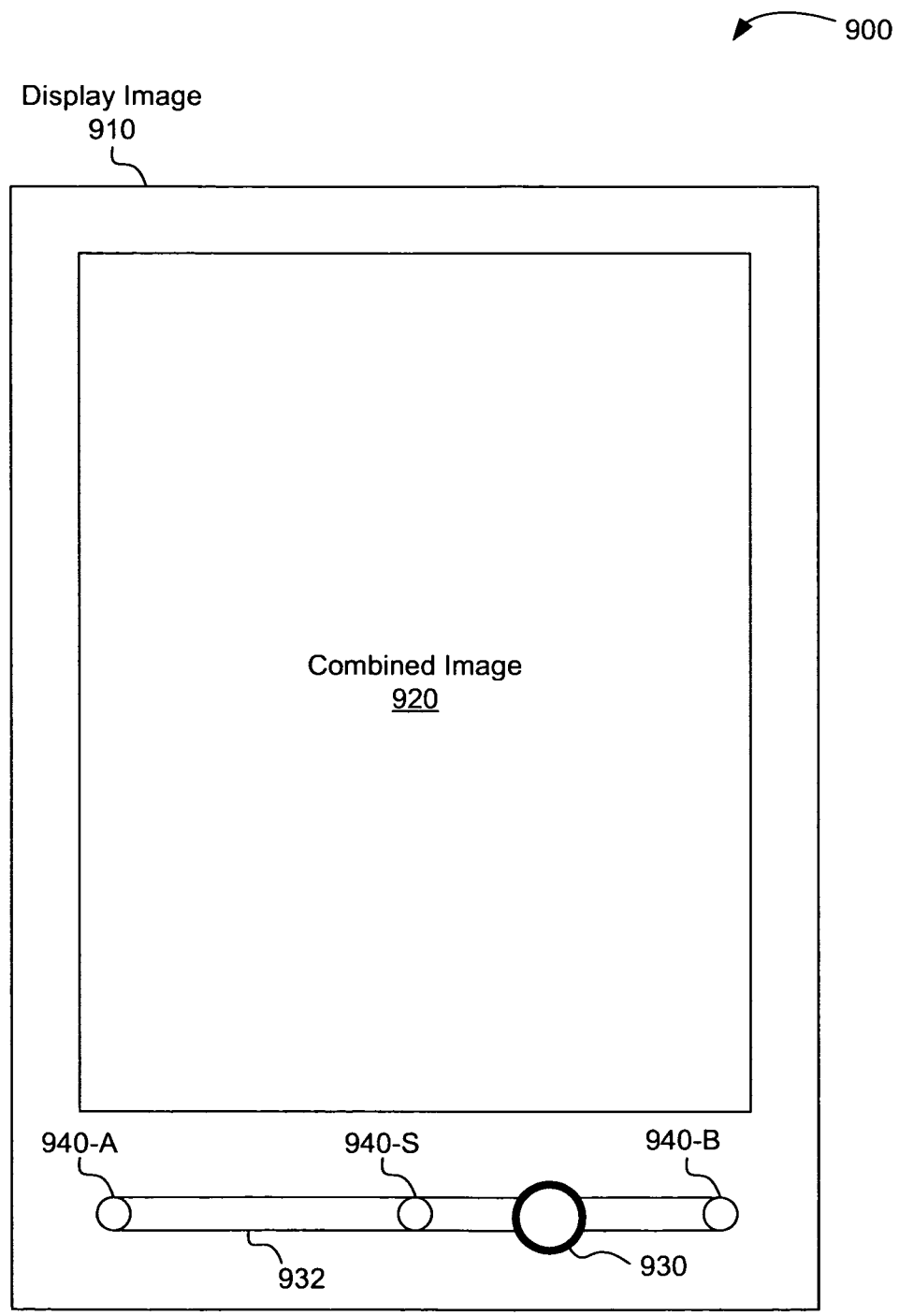
FIG. 9 illustrates a user interface system for generating a combined image, according to one embodiment of the present invention.

FIG. 9 illustrates a user interface (UI) system 900 for generating a combined image 920, according to one embodiment of the present invention. Combined image 920 comprises a combination of at least two related component (source) images. In one embodiment, combined image 920 comprises, without limitation, a combined rendering of an ambient image, a strobe image, and a blended image, such as respective images ambient image 220, strobe image 210, and blended image 280 of FIGS. 2A-2D.

In one embodiment, UI system 900 presents a display image 910 that includes, without limitation, a combined image 920, a slider control 930 configured to move along track 932, and two or more indication points 940, which may each include a visual marker displayed within display image 910.

In one embodiment, UI system 900 is generated by an adjustment tool executing within processor complex 110 and display image 910 is displayed on display unit 112. The at least two component images may reside within NV memory 116, volatile memory 118, memory subsystem 162, or any combination thereof. In another embodiment, UI system 900 is generated by an adjustment tool executing within a computer system, such as a laptop computer, desktop computer. The at least two component images may be transmitted to the computer system or may be generated by an attached camera device. In yet another embodiment, UI system 900 is generated by a cloud-based server computer system, which may download the at least two component images to a client browser, which may execute combining operations described below.

The slider control 930 is configured to move between two end points, corresponding to indication points 940-A and 940-B. One or more indication points, such as indication point 940-S may be positioned between the two end points. Each indication point 940 should be associated with a specific image, which may be displayed as combined image 920 when slider control 930 is positioned directly over the indication point.

In one embodiment, indication point 940-A is associated with the ambient image, indication point 940-S is associated with the strobe image, and indication point 940-B is associated with the blended image. When slider control 930 is positioned at indication point 940-A, the ambient image is displayed as combined image 920. When slider control 930 is positioned at indication point 940-S, the strobe image is displayed as combined image 920. When slider control 930 is positioned at indication point 940-B, the blended image is displayed as combined image 920. In general, when slider control 930 is positioned between indication point 940-A and 940-S, inclusive, a first mix weight is calculated for the ambient image and the strobe image. The first mix weight may be calculated as having a value of 0.0 when the slider control 930 is at indication point 940-A and a value of 1.0 when slider control 930 is at indication point 940-S. A mix operation, described previously, is then applied to the ambient image and the strobe image, whereby a first mix weight of 0.0 gives complete mix weight to the ambient image and a first mix weight of 1.0 gives complete mix weight to the strobe image. In this way, a user may blend between the ambient image and the strobe image. Similarly, when slider control 930 is positioned between indication point 940-S and 940-B, inclusive, a second mix weight may be calculated as having a value of 0.0 when slider control 930 is at indication point 940-S and a value of 1.0 when slider control 930 is at indication point 940-B. A mix operation is then applied to the strobe image and the blended image, whereby a second mix weight of 0.0 gives complete mix weight to the strobe image and a second mix weight of 1.0 gives complete mix weight to the blended image.

This system of mix weights and mix operations provide a UI tool for viewing the ambient image, strobe image, and blended image as a gradual progression from the ambient image to the blended image. In one embodiment, a user may save a combined image 920 corresponding to an arbitrary position of slider control 930. The adjustment tool implementing UI system 900 may receive a command to save the combined image 920 via any technically feasible gesture or technique. For example, the adjustment tool may be configured to save combined image 920 when a user gestures within the area occupied by combined image 920. Alternatively, the adjustment tool may save combined image 920 when a user presses, but does not otherwise move slider control 930. In another implementation, the adjustment tool may save combined image 920 when a user gestures, such as by pressing, a UI element (not shown), such as a save button, dedicated to receive a save command.

In certain embodiments, the adjustment tool also includes a continuous position UI control (not shown), such as a slider control, for providing user input that may override or influence, such as by mixing, otherwise automatically generated values for, without limitation, frameTrust, pixelTrust, or any combination thereof. In one embodiment, a continuous position UI control is configured to indicate and assume a corresponding position for an automatically calculated value, but allow a user to override the value by moving or turning the continuous position UI control to a different position. In other embodiments, the continuous position UI control is configured to have an "automatic" position that causes the automatically calculated value to be used.

Persons skilled in the art will recognize that the above system of mix weights and mix operations may be generalized to include two or more indication points, associated with two or more related images without departing the scope and spirit of the present invention. Such related images may comprise, without limitation, an ambient image and a strobe image, two ambient images having different exposure and a strobe image, or two or more ambient images having different exposure.

Furthermore, a different continuous position UI control, such as a rotating knob, may be implemented rather than slider 930 to provide mix weight input or color adjustment input from the user.

Figure 10:
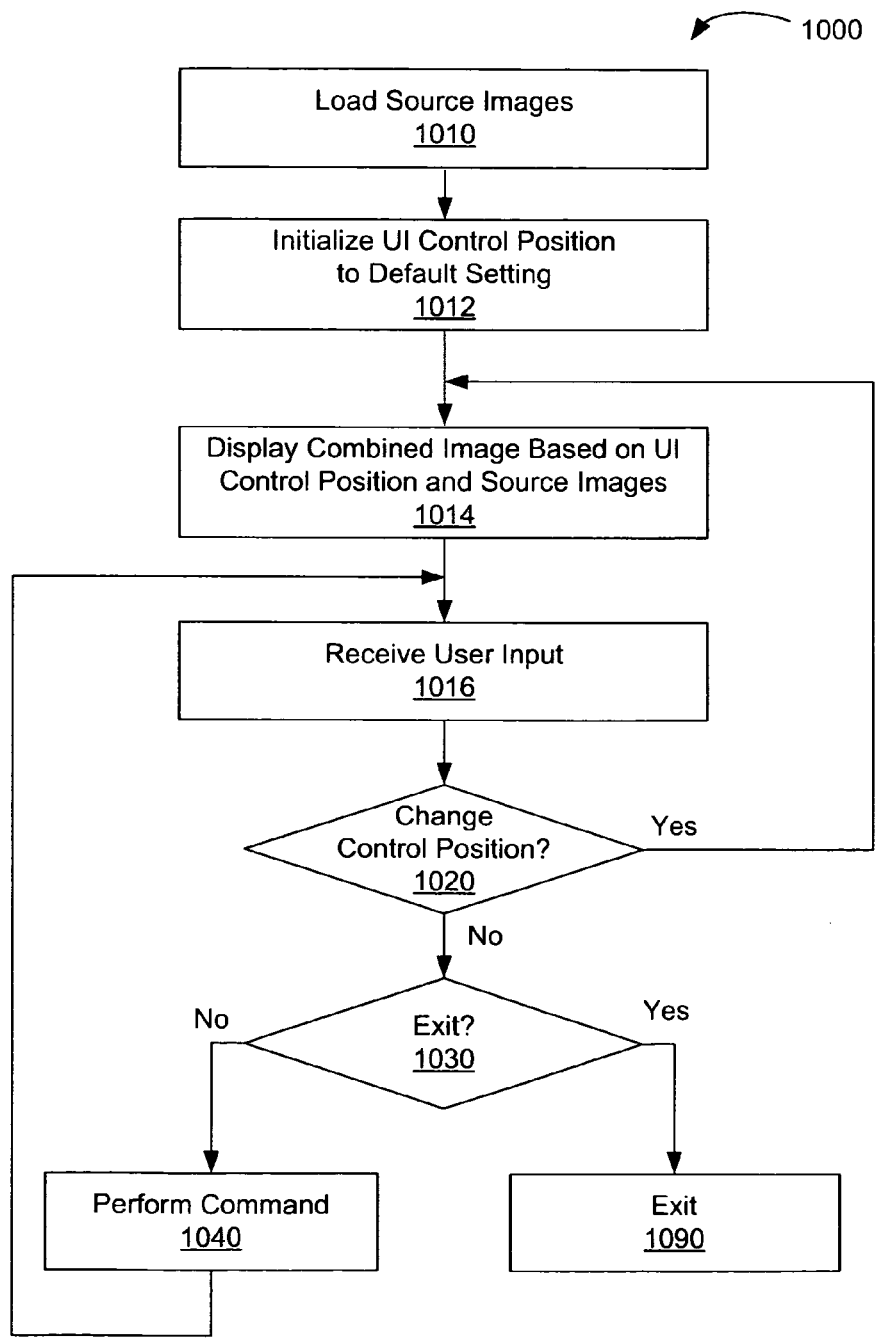
FIG. 10 is a flow diagram of method steps for generating a combined image, according to one embodiment of the present invention.

FIG. 10 is a flow diagram of method 1000 for generating a combined image, according to one embodiment of the present invention. Although the method steps are described in conjunction with the systems of FIGS. 1A-1D, persons skilled in the art will understand that any system configured to perform the method steps, in any order, is within the scope of the present invention.

Method 1000 begins in step 1010, where an adjustment tool executing within a processor complex, such as processor complex 110, loads at least two related source images. In step 1012, the adjustment tool initializes a position for a UI control, such as slider control 930 of FIG. 9, to a default setting. In one embodiment, the default setting comprises an end point, such as indication point 940-B, for a range of values for the UI control. In another embodiment, the default setting comprises a calculated value based one or more of the at least two related source images. In one embodiment, the calculated value comprises a value for frameTrust, as described in FIG. 5A.

In step 1014, the adjustment tool generates and displays a combined image, such as combined image 920, based on a position of the UI control and the at least two related source images. In one embodiment, generating the combined image comprises mixing the at least two related source images as described previously in FIG. 9. In step 1016, the adjustment tool receives user input. The user input may include, without limitation, a UI gesture such as a selection gesture or click gesture within display image 910. If, in step 1020, the user input should change the position of the UI control, then the adjustment tool changes the position of the UI control and the method proceeds back to step 1014. Otherwise, the method proceeds to step 1030.

If, in step 1030, the user input does not comprise a command to exit, then the method proceeds to step 1040, where the adjustment tool performs a command associated with the user input. In one embodiment, the command comprises a save command and the adjustment tool then saves the combined image, which is generated according to a position of the UI control. The method then proceeds back to step 1016.

Returning to step 1030, if the user input comprises a command to exit, then the method terminates in step 1090, where the adjustment tool exits, thereby terminating execution.

In summary, a technique is disclosed for generating a digital photograph that beneficially blends an ambient image sampled under ambient lighting conditions and a strobe image sampled under strobe lighting conditions. The strobe image is blended with the ambient image based on a function that implements a blend surface. Discordant spatial coloration between the strobe image and the ambient image is corrected via a spatial color correction operation. An adjustment tool implements a user interface technique that enables a user to select and save a digital photograph from a gradation of parameters for combining related images.

On advantage of the present invention is that a digital photograph may be generated having consistent white balance in a scene comprising regions illuminated primarily by a strobe of one color balance and other regions illuminated primarily by ambient illumination of a different color balance.

While the forgoing is directed to embodiments of the present invention, other and further embodiments of the invention may be devised without departing from the basic scope thereof, and the scope thereof is determined by the claims that follow.

We claim:

1. A computer program product embodied on a non-transitory computer readable medium, comprising:
   code for generating a color corrected pixel based on a first pixel of a first image, a second pixel of a second image, correction factors, and histogram factors;
   code for generating a blended pixel based on the first pixel, the color corrected pixel, and a blend surface; and
   code for storing the blended pixel within a blended image, wherein the computer program product is operable such that the correction factors characterize color divergence between the first image and the second image, and
   wherein the computer program product is operable such that the histogram factors characterize intensity distribution within the first image and intensity distribution within the second image;
   wherein the correction factors include frame-level correction factors and patch-level correction factors, and wherein generating the color corrected pixel comprises:
      generating adjusted frame-level correction factors based on the frame-level correction factors and the histogram factors;
      generating sampled patch-level correction factors based on the patch-level correction factors;
      generating a pixel-level trust factor based on the first pixel and the second pixel;
      generating pixel-level correction factors based on the adjusted frame-level correction factors, the sampled patch-level correction factors, and the pixel-level trust factor; and
      correcting color associated with the second pixel based on the pixel-level correction factors.

2. The computer program product of claim 1, wherein generating the adjusted frame-level correction factors comprises:
   generating a frame-level trust value based on a first weighted sum of histogram factors associated with the first image and a second weighted sum of histogram factors associated with the second image; and
   mixing the frame-level correction factors with a constant based on the frame-level trust value.

3. The computer program product of claim 1, wherein generating the sampled patch-level correction factors comprises performing a bilinear sampling operation on the patch-level correction factors.

4. The computer program product of claim 1, wherein generating the pixel-level trust factor comprises:
   calculating a first intensity associated with the first pixel;
   calculating a second intensity associated with the second pixel;
   calculating a product of the first intensity and the second intensity; and performing a smoothstep operation based on the product.

5. The computer program product of claim 1, wherein generating the pixel-level correction factors comprises mixing the adjusted frame-level correction factors with the sampled patch-level correction factors based on the pixel-level trust factor.

6. The computer program product of claim 1, wherein correcting color comprises:
   generating an intermediate color corrected pixel by multiplying color components of the second pixel with corresponding components of the pixel-level correction factors;
   calculating a normalization factor based on a vector length of the second pixel and a vector length of the intermediate color corrected pixel; and
   generating a normalized pixel by multiplying each color component of the intermediate color corrected pixel by the normalization factor.

7. The computer program product of claim 6, wherein correcting color further comprises performing a chromatic attractor function on the normalized pixel.

8. The computer program product of claim 1, wherein the correction factors include a set of patch-level correction factors that characterize color divergence between a first representative color associated with a first patch within the first image and a second representative color associated with a corresponding second patch within the second image.

9. The computer program product of claim 8, wherein the first representative color is calculated as an average color for first patch and the second representative color is calculated to be an average color for the second patch.

10. The computer program product of claim 8, wherein the first patch comprises a rectangular region of pixels having a minimum dimension of four pixels within the first image, and the second patch comprises a rectangular region of pixels having a minimum dimension of four pixels within the second image.

11. The computer program product of claim 8, wherein the first representative color and the second representative color each include a red color component, a green color component, and a blue color component, and wherein patch-level correction factors include a red correction factor, a green correction factor, and a blue correction factor.

12. The computer program product of claim 8, wherein the correction factors further include a set of frame-level correction factors that characterize frame-level color divergence between the first image and the second image.

13. The computer program product of claim 1, wherein the histogram factors comprise, for each of the first image and the second image, at least two different intensity values associated with corresponding percentile thresholds.

14. The computer program product of claim 1, wherein the first image comprises an ambient image and the second image comprises a strobe image.

15. The computer program product of claim 1, wherein the first image comprises a strobe image and the second image comprises an ambient image.

16. The computer program product of claim 1, wherein generating the blended pixel comprises:
calculating a first intensity associated with the first pixel;
calculating a second intensity associated with the second pixel;
generating a blend value corresponding to a point on the blend surface, wherein the first intensity and the second intensity comprise coordinates for selecting the point on the blend surface; and
blending the first pixel and the color corrected pixel based on the blend value.

17. The computer program product of claim 16, wherein the blend surface comprises a first region, a second region, and an intervening transition region.

18. The computer program product of claim 17, wherein blend values associated with the first region result in a larger blend contribution from the first pixel than the color corrected pixel and blend values associated with the second region result in a larger blend contribution from the color corrected pixel than the first pixel.

19. The computer program product of claim 17, wherein the transition region comprises a discontinuity.

20. An apparatus, comprising:
at least one processor configured for:
generating a color corrected pixel based on a first pixel of a first image, a second pixel of a second image, correction factors, and histogram factors;
generating a blended pixel based on the first pixel, the color corrected pixel, and a blend surface; and
storing the blended pixel within a blended image,
wherein the apparatus is configured such that the correction factors characterize color divergence between the first image and the second image, and
wherein the apparatus is configured such that the histogram factors characterize intensity distribution within the first image and intensity distribution within the second image;
wherein the correction factors include frame-level correction factors and patch-level correction factors, and
wherein generating the color corrected pixel comprises:
generating adjusted frame-level correction factors based on the frame-level correction factors and the histogram factors;
generating sampled patch-level correction factors based on the patch-level correction factors;
generating a pixel-level trust factor based on the first pixel and the second pixel;
generating pixel-level correction factors based on the adjusted frame-level correction factors, the sampled patch-level correction factors, and the pixel-level trust factor; and
correcting color associated with the second pixel based on the pixel-level correction factors.

21. The apparatus of claim 20, wherein generating the adjusted frame-level correction factors comprises:
generating a frame-level trust value based on a first weighted sum of histogram factors associated with the first image and a second weighted sum of histogram factors associated with the second image; and
mixing the frame-level correction factors with a constant based on the frame-level trust value.

22. The apparatus of claim 20, wherein generating the sampled patch-level correction factors comprises performing a bilinear sampling operation on the patch-level correction factors.

23. The apparatus of claim 20, wherein generating the pixel-level trust factor comprises:
calculating a first intensity associated with the first pixel;
calculating a second intensity associated with the second pixel;
calculating a product of the first intensity and the second intensity; and performing a smoothstep operation based on the product.

24. The apparatus of claim 20, wherein generating the pixel-level correction factors comprises mixing the adjusted frame-level correction factors with the sampled patch-level correction factors based on the pixel-level trust factor.

25. The apparatus of claim 20, wherein correcting color comprises:
generating an intermediate color corrected pixel by multiplying color components of the second pixel with corresponding components of the pixel-level correction factors;
calculating a normalization factor based on a vector length of the second pixel and a vector length of the intermediate color corrected pixel; and
generating a normalized pixel by multiplying each color component of the intermediate color corrected pixel by the normalization factor.

26. The apparatus of claim 25, wherein correcting color further comprises performing a chromatic attractor function on the normalized pixel.

27. The apparatus of claim 20, wherein the correction factors include a set of patch-level correction factors that characterize color divergence between a first representative color associated with a first patch within the first image and a second representative color associated with a corresponding second patch within the second image.

28. The apparatus of claim 27, wherein the first representative color is calculated as an average color for first patch and the second representative color is calculated to be an average color for the second patch.

29. The apparatus of claim 27, wherein the first patch comprises a rectangular region of pixels having a minimum dimension of four pixels within the first image, and the second patch comprises a rectangular region of pixels having a minimum dimension of four pixels within the second image.

30. The apparatus of claim 27, wherein the first representative color and the second representative color each include a red color component, a green color component, and a blue color component, and wherein patch-level correction factors include a red correction factor, a green correction factor, and a blue correction factor.

31. The apparatus of claim 27, wherein the correction factors further include a set of frame-level correction factors that characterize frame-level color divergence between the first image and the second image.

32. The apparatus of claim 20, wherein the histogram factors comprise, for each of the first image and the second image, at least two different intensity values associated with corresponding percentile thresholds.

33. The apparatus of claim 20, wherein the first image comprises an ambient image and the second image comprises a strobe image.

34. The apparatus of claim 20, wherein the first image comprises a strobe image and the second image comprises an ambient image.

35. The apparatus of claim 20, wherein generating the blended pixel comprises:
    calculating a first intensity associated with the first pixel;
    calculating a second intensity associated with the second pixel;
    generating a blend value corresponding to a point on the blend surface, wherein the first intensity and the second intensity comprise coordinates for selecting the point on the blend surface; and
    blending the first pixel and the color corrected pixel based on the blend value.

36. The apparatus of claim 35, wherein the blend surface comprises a first region, a second region, and an intervening transition region.

37. The apparatus of claim 36, wherein blend values associated with the first region result in a larger blend contribution from the first pixel than the color corrected pixel and blend values associated with the second region result in a larger blend contribution from the color corrected pixel than the first pixel.

38. The apparatus of claim 20, wherein the transition region comprises a discontinuity.

39. The apparatus of claim 20, wherein the at least one processor is part of a processor complex.

40. A method, comprising:
    generating a color corrected pixel based on a first pixel of a first image, a second pixel of a second image, correction factors, and histogram factors;
    generating a blended pixel based on the first pixel, the color corrected pixel, and a blend surface; and
    storing the blended pixel within a blended image,
    wherein the correction factors characterize color divergence between the first image and the second image, and
    wherein the histogram factors characterize intensity distribution within the first image and intensity distribution within the second image;
    wherein the correction factors include frame-level correction factors and patch-level correction factors, and wherein generating the color corrected pixel comprises:
        generating adjusted frame-level correction factors based on the frame-level correction factors and the histogram factors;
        generating sampled patch-level correction factors based on the patch-level correction factors;
        generating a pixel-level trust factor based on the first pixel and the second pixel;
        generating pixel-level correction factors based on the adjusted frame-level correction factors, the sampled patch-level correction factors, and the pixel-level trust factor; and
        correcting color associated with the second pixel based on the pixel-level correction factors.

* * * * *